(12) United States Patent
Shigeta

(10) Patent No.: US 11,849,218 B2
(45) Date of Patent: Dec. 19, 2023

(54) LENS APPARATUS, IMAGE PICKUP APPARATUS, CAMERA APPARATUS, CONTROLLING METHOD, AND COMPUTER-READABLE STORAGE MEDIUM

(71) Applicant: CANON KABUSHIKI KAISHA, Tokyo (JP)

(72) Inventor: Junji Shigeta, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 126 days.

(21) Appl. No.: 17/530,584

(22) Filed: Nov. 19, 2021

(65) Prior Publication Data

US 2022/0174207 A1 Jun. 2, 2022

(30) Foreign Application Priority Data

Nov. 30, 2020 (JP) ................................. 2020-199008

(51) Int. Cl.
| | |
|---|---|
| *H04N 23/67* | (2023.01) |
| *H04N 23/617* | (2023.01) |
| *H04N 23/65* | (2023.01) |
| *H04N 23/663* | (2023.01) |
| *G03B 5/02* | (2021.01) |
| *G02B 7/02* | (2021.01) |
| *G02B 7/04* | (2021.01) |

(52) U.S. Cl.
CPC ............. *H04N 23/67* (2023.01); *G02B 7/021* (2013.01); *G02B 7/04* (2013.01); *G03B 5/02* (2013.01); *H04N 23/617* (2023.01); *H04N 23/651* (2023.01); *H04N 23/663* (2023.01); *H04N 23/673* (2023.01); *G03B 2205/0069* (2013.01)

(58) Field of Classification Search
CPC ..... G06N 3/08–0985; G06N 20/00–20; H04N 23/617; H04N 23/682; H04N 23/685; H04N 23/686; H04N 23/687; G02B 27/64; G02B 27/646; G02B 7/04; G02B 7/09–105; G02B 7/28–40; G03B 5/02; G03B 2205/00–0038; G03B 2205/0053–0084; G03B 13/32–36
See application file for complete search history.

(56) References Cited

U.S. PATENT DOCUMENTS

| | | | |
|---|---|---|---|
| 2018/0184064 A1* | 6/2018 | Cheng | H04N 23/611 |
| 2021/0199911 A1* | 7/2021 | Shimizu | G03B 3/10 |
| 2022/0191386 A1* | 6/2022 | Kanayama | G06N 20/00 |
| 2022/0286614 A1* | 9/2022 | Sumioka | H02N 2/026 |

(Continued)

FOREIGN PATENT DOCUMENTS

| | | | | |
|---|---|---|---|---|
| CN | 107680053 A | * | 2/2018 | ........... G06K 9/6256 |
| JP | 2007006305 A | | 1/2007 | |

*Primary Examiner* — Paul M Berardesca
(74) *Attorney, Agent, or Firm* — ROSSI, KIMMS & McDOWELL LLP

(57) ABSTRACT

A lens apparatus is provided that includes: an optical member; a driving device configured to drive the optical member; and a controller configured to control the driving device based on a first learned model, wherein the first learned model is a learned model obtained by learning with respect to the lens apparatus using a second learned model as an initial learned model, the second learned model being obtained by learning with respect to an apparatus different from the lens apparatus.

16 Claims, 21 Drawing Sheets

(56) References Cited

U.S. PATENT DOCUMENTS

| | | | |
|---|---|---|---|
| 2023/0033426 A1* | 2/2023 | Sumioka | H04N 23/54 |
| 2023/0147581 A1* | 5/2023 | Sumioka | G05B 11/36 |
| | | | 348/208.7 |

* cited by examiner

FIG. 9

| | | REWARD INFORMATION | | | | | | | |
|---|---|---|---|---|---|---|---|---|---|
| | | DEVICE CONSTRAINT REWARD INFOMATION | | | | USER-REQUEST REWARD INFORMATION | | | |
| | | POSITIONING PRECISION REWARD INFORMATION REb | | | | POSITIONING PRECISION REWARD INFORMATION REu | | | |
| POSITIONING PRECISION | | BOUNDARY VALUE | | SCORE | | BOUNDARY VALUE | | SCORE | |
| | | Eb1 | Eb2 | SEb1 | SEb2 SEb3 | Eu1 | Eu2 | SEu1 | SEu2 SEu3 |
| | | VELOCITY REWARD INFORMATION RVb | | | | VELOCITY REWARD INFORMATION RVu | | | |
| VELOCITY | | BOUNDARY VALUE | | SCORE | | BOUNDARY VALUE | | SCORE | |
| | | Vb1 | Vb2 | SVb1 | SVb2 SVb3 | Vu1 | Vu2 | SVu1 | SVu2 SVu3 |
| | | ACCELERATION REWARD INFORMATION RAb | | | | ACCELERATION REWARD INFORMATION RAu | | | |
| ACCELERATION | | BOUNDARY VALUE | | SCORE | | BOUNDARY VALUE | | SCORE | |
| | | Ab1 | Ab2 | SAb1 | SAb2 SAb3 | Au1 | Au2 | SAu1 | SAu2 SAu3 |
| | | POWER CONSUMPTION REWARD INFORMATION RPb | | | | POWER CONSUMPTION REWARD INFORMATION RPu | | | |
| POWER CONSUMPTION | | BOUNDARY VALUE | | SCORE | | BOUNDARY VALUE | | SCORE | |
| | | Pb1 | Pb2 | SPb1 | SPb2 SPb3 | Pu1 | Pu2 | SPu1 | SPu2 SPu3 |

FIG. 11A

| | POSITIONING PRECISION REWARD INFORMATION REb ||||| 
|---|---|---|---|---|---|
| | BOUNDARY VALUE || SCORE |||
| | Eb1 | Eb2 | SEb1 | SEb2 | SEb3 |
| MODEL A | Eb1TA | Eb2TA | SEb1TA | SEb2TA | SEb3TA |
| MODEL B | Eb1TB | Eb2TB | SEb1TB | SEb2TB | SEb3TB |
| MODEL C | Eb1TC | Eb2TC | SEb1TC | SEb2TC | SEb3TC |

FIG. 11B

| | VELOCITY REWARD INFORMATION RVb |||||
|---|---|---|---|---|---|
| | BOUNDARY VALUE || SCORE |||
| | Vb1 | Vb2 | SVb1 | SVb2 | SVb3 |
| MODEL A | Vb1TA | Vb2TA | SVb1TA | SVb2TA | SVb3TA |
| MODEL B | Vb1TB | Vb2TB | SVb1TB | SVb2TB | SVb3TB |
| MODEL C | Vb1TC | Vb2TC | SVb1TC | SVb2TC | SVb3TC |

FIG. 11C

| | ACCELERATION REWARD INFORMATION RAb |||||
|---|---|---|---|---|---|
| | BOUNDARY VALUE || SCORE |||
| | Ab1 | Ab2 | SAb1 | SAb2 | SAb3 |
| MODEL A | Ab1TA | Ab2TA | SAb1TA | SAb2TA | SAb3TA |
| MODEL B | Ab1TB | Ab2TB | SAb1TB | SAb2TB | SAb3TB |
| MODEL C | Ab1TC | Ab2TC | SAb1TC | SAb2TC | SAb3TC |

FIG. 11D

| | POWER CONSUMPTION REWARD INFORMATION RPb |||||
|---|---|---|---|---|---|
| | BOUNDARY VALUE || SCORE |||
| | Pb1 | Pb2 | SPb1 | SPb2 | SPb3 |
| MODEL A | Pb1TA | Pb2TA | SPb1TA | SPb2TA | SPb3TA |
| MODEL B | Pb1TB | Pb2TB | SPb1TB | SPb2TB | SPb3TB |
| MODEL C | Pb1TC | Pb2TC | SPb1TC | SPb2TC | SPb3TC |

FIG. 12

| USER-REQUEST ID | POSITIONING PRECISION USER-REQUEST INFORMATION Eu | QUIETNESS USER-REQUEST INFORMATION Su | POWER CONSUMPTION USER-REQUEST INFORMATION Pu | USER IDENTIFICATION INFORMATION | IMAGE PICKUP CONDITIONS | TIME OF CREATION |
|---|---|---|---|---|---|---|
| u1 | LEVEL1 | LEVEL2 | LEVEL3 | User1 | C1 | Date1 |
| u2 | LEVEL3 | LEVEL1 | LEVEL2 | User1 | C1 | Date2 |
| u3 | LEVEL2 | LEVEL3 | LEVEL1 | User2 | C2 | Date3 |

FIG. 13A

| | POSITIONING PRECISION USER-REQUEST REWARD CONVERSION INFORMATION UREu | | |
|---|---|---|---|
| | LEVEL1 | LEVEL2 | LEVEL3 |
| MODEL A | REuTAL1 | REuTAL2 | REuTAL3 |
| MODEL B | REuTBL1 | REuTBL2 | REuTBL3 |
| MODEL C | REuTCL1 | REuTCL2 | REuTCL3 |

FIG. 13B

| | QUIETNESS USER-REQUEST REWARD CONVERSION INFORMATION URSu | | | | | |
|---|---|---|---|---|---|---|
| | VELOCITY USER-REQUEST REWARD CONVERSION INFORMATION URVu | | | ACCELERATION USER-REQUEST REWARD CONVERSION INFORMATION URAu | | |
| | LEVEL1 | LEVEL2 | LEVEL3 | LEVEL1 | LEVEL2 | LEVEL3 |
| MODEL A | RVuTAL1 | RVuTAL2 | RVuTAL3 | RAuTAL1 | RAuTAL2 | RAuTAL3 |
| MODEL B | RVuTBL1 | RVuTBL2 | RVuTBL3 | RAuTBL1 | RAuTBL2 | RAuTBL3 |
| MODEL C | RVuTCL1 | RVuTCL2 | RVuTCL3 | RAuTCL1 | RAuTCL2 | RAuTCL3 |

FIG. 13C

| | POWER CONSUMPTION USER-REQUEST REWARD CONVERSION INFORMATION URPu | | |
|---|---|---|---|
| | LEVEL1 | LEVEL2 | LEVEL3 |
| MODEL A | RPuTAL1 | RPuTAL2 | RPuTAL3 |
| MODEL B | RPuTBL1 | RPuTBL2 | RPuTBL3 |
| MODEL C | RPuTCL1 | RPuTCL2 | RPuTCL3 |

FIG. 14

| REWARD INFORMATION ID | TIME OF CREATION | MODEL INFORMATION | USER-REQUEST INFORMATION u | DEVICE CONSTRAINT REWARD INFORMATION Rb | USER-REQUEST REWARD INFORMATION Ru | USER-REQUEST REWARD CONVERSION INFORMATION URu |
|---|---|---|---|---|---|---|
| RID1 | Date1 | MODEL A | u1 | RbA1 | Ru1A1 | URu1 |
| RID2 | Date2 | MODEL A | u2 | RbA1 | Ru2A1 | URu1 |
| RID3 | Date3 | MODEL B | u2 | RbB1 | Ru2B1 | URu1 |
| RID4 | Date4 | MODEL B | u2 | RbB2 | Ru2B2 | URu2 |

FIG. 16

| MACHINE LEARNING MODEL ID | TIME OF CREATION | REWARD INFORMATION ID | MACHINE LEARNING MODEL NN | MACHINE LEARNING MODEL INITIAL VALUE NNi |
|---|---|---|---|---|
| NNID1 | Date1 | RID1 | NN1 | NNi1 |
| NNID2 | Date2 | RID1 | NN2 | NNi1 |
| NNID3 | Date3 | RID2 | NN3 | NNi2 |
| NNID4 | Date4 | RID2 | NN4 | NNi3 |

FIG. 18A

| | POSITIONING PRECISION REWARD INFORMATION REu | | | | |
|---|---|---|---|---|---|
| | BOUNDARY VALUE | | SCORE | | |
| | Eu1 | Eu2 | SEu1 | SEu2 | SEu3 |
| RID1 | Eu1R1 | Eu2R1 | SEu1R1 | SEu2R1 | SEu3R1 |
| RID2 | Eu1R2 | Eu2R2 | SEu1R2 | SEu2R2 | SEu3R2 |
| RID3 | Eu1R3 | Eu2R3 | SEu1R3 | SEu2R3 | SEu3R3 |

FIG. 18B

| | VELOCITY REWARD INFORMATION RVu | | | | |
|---|---|---|---|---|---|
| | BOUNDARY VALUE | | SCORE | | |
| | Vu1 | Vu2 | SVu1 | SVu2 | SVu3 |
| RID1 | Vu1R1 | Vu2R1 | SVu1R1 | SVu2R1 | SVu3R1 |
| RID2 | Vu1R2 | Vu2R2 | SVu1R2 | SVu2R2 | SVu3R2 |
| RID3 | Vu1R3 | Vu2R3 | SVu1R3 | SVu2R3 | SVu3R3 |

FIG. 18C

| | ACCELERATION REWARD INFORMATION RAu | | | | |
|---|---|---|---|---|---|
| | BOUNDARY VALUE | | SCORE | | |
| | Au1 | Au2 | SAu1 | SAu2 | SAu3 |
| RID1 | Au1R1 | Au2R1 | SAu1R1 | SAu2R1 | SAu3R1 |
| RID2 | Au1R2 | Au2R2 | SAu1R2 | SAu2R2 | SAu3R2 |
| RID3 | Au1R3 | Au2R3 | SAu1R3 | SAu2R3 | SAu3R3 |

FIG. 18D

| | POWER CONSUMPTION REWARD INFORMATION RPu | | | | |
|---|---|---|---|---|---|
| | BOUNDARY VALUE | | SCORE | | |
| | Pu1 | Pu2 | SPu1 | SPu2 | SPu3 |
| RID1 | Pu1R1 | Pu2R1 | SPu1R1 | SPu2R1 | SPu3R1 |
| RID2 | Pu1R2 | Pu2R2 | SPu1R2 | SPu2R2 | SPu3R2 |
| RID3 | Pu1R3 | Pu2R3 | SPu1R3 | SPu2R3 | SPu3R3 |

FIG. 19

| USER-REQUEST ID | POSITIONING PRECISION USER-REQUEST INFORMATION Eu | QUIETNESS USER-REQUEST INFORAMTION Su | POWER CONSUMPTION USER-REQUEST INFORMATION Pu |
|---|---|---|---|
| u1 | LEVEL1 | LEVEL2 | LEVEL3 |
| u2 | LEVEL3 | LEVEL1 | LEVEL2 |
| u3 | LEVEL2 | LEVEL3 | LEVEL1 |

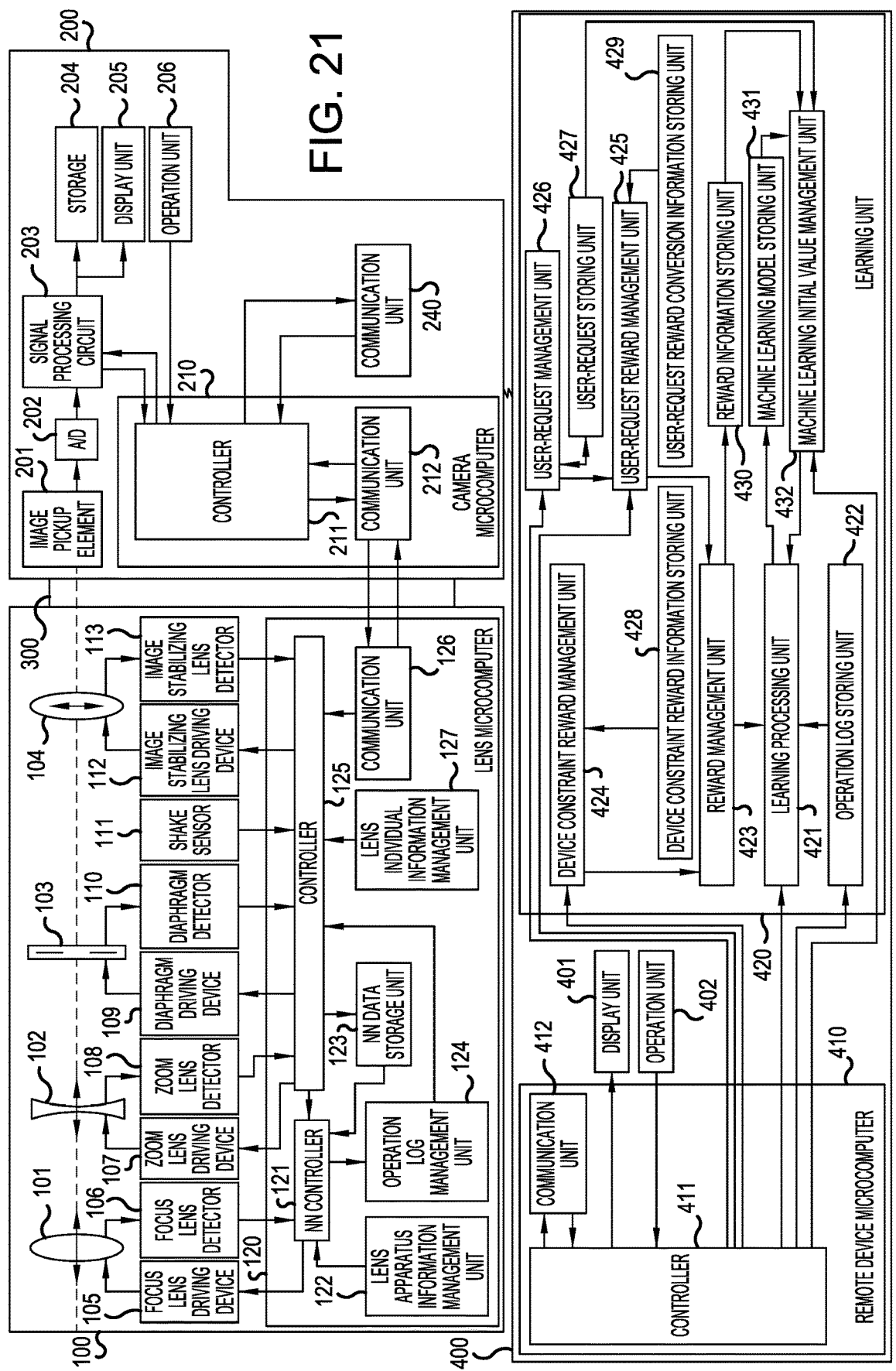

LENS APPARATUS, IMAGE PICKUP APPARATUS, CAMERA APPARATUS, CONTROLLING METHOD, AND COMPUTER-READABLE STORAGE MEDIUM

BACKGROUND OF THE INVENTION

Field of the Disclosure

The present disclosure relates to a lens apparatus, an image pickup apparatus, a camera apparatus, a controlling method, and a computer-readable storage medium.

Description of the Related Art

Conventionally, a digital camera and a video camera have been used to take still images and moving images, respectively. In recent years, however, the digital cameras capable of photographing and recording moving images have been commercialized.

Further, in the still image photographing, since the impotence is placed on a snapshot property, high-speed operations for an autofocus, a diaphragm, an electric zooming and the like are required. On the other hand, in the moving image photographing, if the operation sound of driving devices for a focus, a diaphragm, a zoom and the like is loud, the operation sound is recorded as noise together with sound to be recorded. Japanese Patent Application Laid-Open No. 2007-6305 discloses a lens apparatus for solving these two problems.

Further, in an image pickup apparatus, the performance required for driving device of optical member is diverse. Examples include the driving velocity for tracking, the positioning precision of optical members for precise image pickup condition settings, low power consumption for ensuring shooting time, and a quietness performance for a video shooting. Their performances are interdependent. The lens apparatus disclosed in Japanese Patent Application Laid-Open No. 2007-6305 has realized the quietness performance by limiting the velocity and the acceleration at which the optical member is driven in the moving image photographing.

However, the required quietness performance may vary depending on the user. The required velocity and acceleration may also vary depending on the user and the state of the lens apparatus. Further, the required positioning precision of the optical member may also vary depending on the user and the state of lens apparatus.

The drive control of lens apparatus can be performed based on a machine learning model (learned model) obtained by the machine learning performed using the lens apparatus. However, a large number of drives of the lens apparatus may be required for the machine learning.

SUMMARY OF THE INVENTION

An aspect of the disclosure provides, for example, a lens apparatus beneficial in obtaining a learned model. An aspect of the disclosure provides a lens apparatus comprising: an optical member; a driving device configured to drive the optical member; and a controller configured to control the driving device based on a first learned model, wherein the first learned model is a learned model obtained by learning with respect to the lens apparatus using a second learned model as an initial learned model, the second learned model being obtained by learning with respect to an apparatus different from the lens apparatus.

Further features of the present invention will become apparent from the following description of exemplary embodiments with reference to the attached drawings.

BRIEF DESCRIPTION OF THE DRAWINGS

FIG. 9 is a view illustrating an example of data structures of device constraint reward information and user-request reward information.

FIG. 11A is a view illustrating an example of a data structure of a device constraint reward information database.

FIG. 11B is a view illustrating an example of the data structure of the device constraint reward information database.

FIG. 11C is a view illustrating an example of the data structure of the device constraint reward information database.

FIG. 11D is a view illustrating an example of the data structure of the device constraint reward information database.

FIG. 12 is a view illustrating an example of a structure of a user-request information database.

FIG. 13A is a view illustrating an example of a data structure of a user-request reward conversion information database.

FIG. 13B is a view illustrating an example of the data structure of the user-request reward conversion information database.

FIG. 13C is a view illustrating an example of the data structure of the user-request reward conversion information database.

FIG. 14 is a view illustrating an example of a data structure of a reward information database.

FIG. 16 is a view illustrating an example of a data structure of a machine learning model database.

FIG. 18A is a view illustrating an example of the value of user-request reward information in the reward information.

FIG. 18B is a view illustrating an example of the value of the user-request reward information in the reward information.

FIG. 18C is a view illustrating an example of the value of the user-request reward information in the reward information.

FIG. 18D is a view illustrating an example of the value of the user-request reward information in the reward information.

FIG. 19 is a view illustrating an example of the value of user-request in user-request information.

FIG. 21 is a block diagram illustrating a system configuration according to a third embodiment.

DESCRIPTION OF THE EMBODIMENTS

Figure 1:
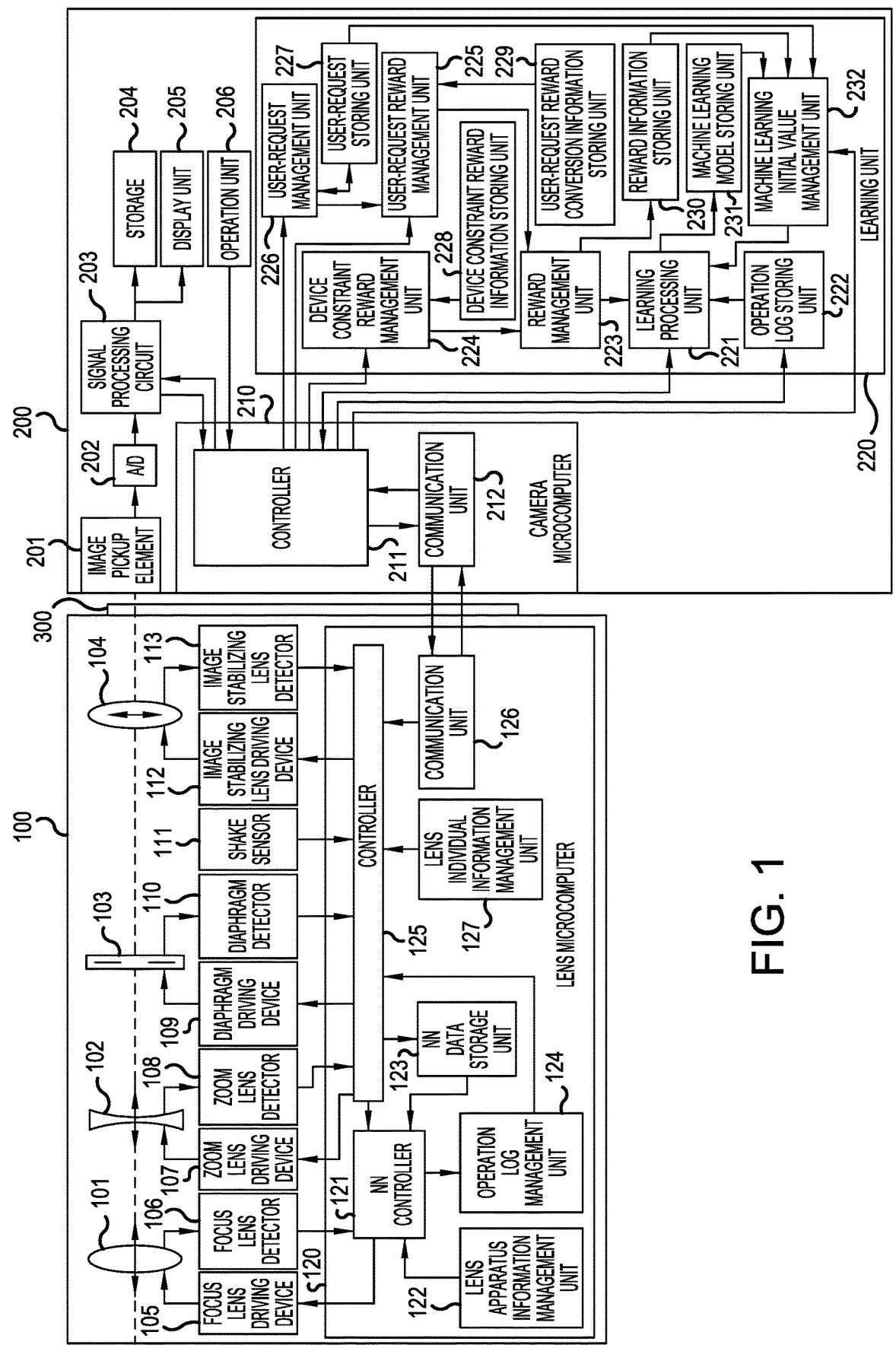
FIG. 1 is a block diagram illustrating a system configuration according to a first embodiment.

Preferred embodiments of the present invention will now be described in detail in accommodation with the accompanying drawings.

However, the dimensions, materials, shapes and relative positions of the components described in the following embodiments are not limited, and can be changed according to a configuration of an apparatus to which the present invention is applied or to various conditions. Further, identical or functionally similar elements are denoted by the same reference numerals in different drawings.

Hereinafter, the term "learned model" refers to a model which, with respect to a machine learning model that is in accordance with any machine learning algorithm such as deep learning, performed training (learning) in advance. However, although the learned model is a model learned in advance, it is assumed that the learned model is not a model that does not perform further learning, and is a model that can also perform additional learning.

First Embodiment

Hereunder, an imaging system according to first embodiment of the present disclosure will be described referring to FIG. 1 to FIG. 19. In the present embodiment, a camera system will be described as an example of an imaging system.

<Configuration of Camera System>

Hereunder, a system configuration of the camera system according to the present embodiment will be described referring to FIG. 1. FIG. 1 is a block diagram illustrating the system configuration of the camera system according to the present embodiment.

The camera system according to the present embodiment includes a camera body 200 as an example of an image pickup apparatus and a lens 100 as an example of a lens apparatus. The camera body 200 and the lens 100 are mechanically and electrically connected to each other via a mount 300 serving as a mounting mechanism. The camera body 200 supplies power to the lens 100 via a power supply terminal (not shown) provided on the mount 300. The camera body 200 and the lens 100 communicate with each other via a communication terminal (not shown) provided on the mount 300.

The lens 100 has an image pickup optical system. The image pickup optical system includes a focus lens 101 for performing focus adjustment, a zoom lens 102 for performing a zoom, a diaphragm unit 103 for adjusting the quantity of light, and an image stabilizing lens 104. The focus lens 101 and the zoom lens 102 are held by a lens holding frame (not shown). The lens holding frame is guided movably in an optical axis direction (indicated by a broken line in the drawing) by a guide axis (not shown).

The focus lens 101 is moved in the optical axis direction via a focus lens driving device 105. The position of the focus lens 101 is detected by a focus lens detector 106.

The zoom lens 102 is moved in the optical axis direction via a zoom lens driving device 107. The position of the zoom lens 102 is detected by a zoom lens detector 108.

The diaphragm unit 103 is provided with diaphragm blades, which are driven via a diaphragm driving device 109 to perform a light quantity adjusting operation. An f-number of the diaphragm is detected by a diaphragm detector 110.

The image stabilizing lens 104 is moved in a direction orthogonal to the optical axis via an image stabilizing lens driving device 112, and reduces an image shake caused by a camera shake or the like. The position of the image stabilizing lens 104 is detected by an image stabilizing lens detector 113.

For example, ultrasonic motors are used for the focus lens driving device 105, the zoom lens driving device 107, the diaphragm driving device 109, and the image stabilizing lens driving device 112. Although an ultrasonic motor is used in the present embodiment, other motors (a voice coil motor, a DC motor, a stepping motor, etc.) may be used.

The focus lens detector 106, the zoom lens detector 108, the diaphragm detector 110, and the image stabilizing lens detector 113 include, for example, a potentiometer and an encoder. Further, if the driving devices are constituted by using a motor such as a stepping motor and the like which can drive an optical member by a predetermined driving amount without feedback, a means for detecting the position of the lens or the like based on the driving amount of the driving device may be provided. In this case, an optical member is initially driven to a predetermined position where a detection sensor such as a photo-interrupter is provided, and after the initial drive, the position of the optical member may be specified based on the motor drive amount.

The shake sensor 111 is a sensor for detecting a shake of the lens 100. The shake sensor 111 may be constituted by using, for example, a gyro sensor or the like.

Next, a lens microcomputer 120 that controls the drive and the communication of the lens 100 will be described. In the lens microcomputer 120, there are provided an NN controller 121, a lens apparatus information management unit 122, an NN data storage unit 123, an operation log management unit 124, a controller 125, a communication unit 126, and a lens individual information management unit 127.

The NN controller 121 is a controller for controlling the position of the focus lens 101. A neural network (NN) algorithm is implemented in the NN controller 121, and the NN controller 121 determines a drive command of the focus lens driving device 105 by the NN algorithm based on the target position or the like of the focus lens 101. The details of the NN algorithm will be described later.

The lens apparatus information management unit 122 is a management unit for managing a lense apparatus information used in the NN controller 121. Here, the lens apparatus information is information relating to an image pickup condition of the lens apparatus, which affects a photographed image, and includes, for example, the depth of focus and focus sensitivity.

The NN data storage unit 123 is a storage unit for storing weight which is a connection weighting coefficient of the NN. The operation log management unit 124 is a management unit for managing operation log information related to a drive control of the focus lens 101. Here, the operation log information is control result information to be an object for determination of a score upon scoring the control result of the NN algorithm. The operation log information may include, for example, a target position and position information of the focus lens, driving velocity and acceleration of the focus lens, and power consumption of the focus lens driving device 105, and the like.

The controller 125 controls the positions of the zoom lens 102, the diaphragm unit 103, and the image stabilizing lens 104, and controls information transmission between the lens 100 and the camera body 200. For example, the controller 125 generates a drive command by PID (Proportional-Integral-Differential) control for a deviation between a target position or velocity of a controlled object and the current position or velocity of the control object to control the control object.

The communication unit 126 is a communication unit for communicating with the camera body 200. The lens individual information management unit 127 is a management unit for managing lens individual information (lens information) which is information indicating at least one of a lens model and an individual identification number of the lens 100.

Next, the camera body 200 will be described. The camera body 200 includes an image pickup element 201, an A/D conversion circuit 202, a signal processing circuit 203, a storage 204, a display unit 205, an operation unit 206, a camera microcomputer 210, and a learning unit 220.

The image pickup element 201 is an image pickup element for converting the light incident from the lens 100 into an image electric signal. The image pickup element 201 includes, for example, a CCD sensor or a CMOS sensor. The A/D conversion circuit 202 is a conversion circuit for converting the image electric signal output from the image pickup element 201 into a digital signal. The signal processing circuit 203 is a signal processing circuit for converting the digital signal output from the A/D conversion circuit 202 into an image data.

The storage 204 is a storage for recording the image data output from the signal processing circuit 203. The display unit 205 is a display unit for displaying the image data output from the signal processing circuit 203 and various kinds of information such as user-request information. The display unit 205 may be configured using any known monitor.

The operation unit 206 is an operation unit for the user to operate the camera. The operation unit 206 may be constructed using any known input member, such as, a button. Further, if the display unit 205 is constituted by using a touch panel, the operation unit 206 may be constituted integrally with the display unit 205.

The camera microcomputer 210 is a control microcomputer for controlling the camera body 200. The camera microcomputer 210 includes a controller 211 and a communication unit 212.

The controller 211 is a controller that issues a drive command to the lens 100 based on the image data from the signal processing circuit 203 and a user operation information from the operation unit 206. The controller 211 also controls commands and information transmission to the learning unit 220.

The communication unit 212 is a communication unit for communicating with the lens 100. More specifically, the communication unit 212 transmits a drive command from the controller 211 to the lens 100 as a control command. The communication unit 212 also receives information from the lens 100.

The learning unit 220 may be configured using a processor and a storage device. The processor may includes any processor such as a CPU (Central Processing Unit) or a GPU (Graphic Processing Unit). The storage device may be configured using any storage medium such as a ROM (Read Only Memory), a RAM (Random Access Memory), or an HDD (Hard Disc Drive).

The learning unit 220 includes a learning processing unit 221, an operation log storing unit 222, a reward management unit 223, a device constraint reward management unit 224, a user-request reward management unit 225, a user-request management unit 226, a user-request storing unit 227, and a device constraint reward information storing unit 228. The learning unit 220 also includes a user-request reward conversion information storing unit 229, a reward information storing unit 230, a machine learning model storing unit 231, and a machine learning initial value management unit 232. Each component of the learning unit 220 may be realized by a processor such as the CPU or the MPU executing a software module stored in the storage device. The processor may include, for example, a GPU or a field-programmable gate array (FPGA). In addition, each component of the learning unit 220 may be configured by a circuit or the like that performs a specific function, such as an ASIC (Application Specific Integrated Circuit).

The learning processing unit 221 performs learning processing of an NN provided in the NN controller 121. In the present embodiment, for the control of the focus lens 101 using the NN, the learning processing unit 221 uses evaluation values of operations corresponding to the reward information based on the device restriction information of each lens apparatus and the request information from the user as a reward, and performs the reinforcement learning to the NN so that the reward becomes maximum.

The device constraint reward management unit 224 manages device constraint reward information which is reward information on the device constraint information for each lens apparatus. Specifically, the device constraint reward management unit 224 determines device constraint reward information corresponding to the lens 100 from a device constraint reward information database stored by the device constraint reward information storing unit 228 according to lens model information included in the lens individual information. The device constraint reward information database stores the lens model information and the device constraint reward information in association with each other.

The user-request reward management unit 225 manages user-request reward information which is reward information on the request information from the user. The user-request reward conversion information storing unit 229 stores a user-request reward conversion information database which stores the lens model information of the lens individual information and user-request reward conversion information in association with each other. The user-request reward conversion information storing unit 229 determines user-request reward conversion information corresponding to the lens 100 from the user-request reward conversion information database according to the lens model information of the lens individual information. The user-request reward conversion information storing unit 229 refers to the determined user-request reward conversion information to convert the user-request information set by the user to the user-request reward information. The user-request reward management unit 225 manages the converted user-request reward information in association with the user-request information set by the user.

The user-request management unit 226 manages user-request information to be applied to the current control, which is set by the user. The user-request storing unit 227 stores a user-request information database storing the user-request information set by the user.

The reward management unit 223 combines the device constraint reward information and the user-request reward information to determine and manage the reward information. The reward information storing unit 230 stores a reward information database storing the reward information.

The machine learning model storing unit 231 stores a machine learning database storing a machine learning model. Also, the machine learning model storing unit 231 selects a learned model to be used for determining an initial value of machine learning of the NN from the machine learning model database according to the lens individual information and the request from the user. The machine learning initial value management unit 232 manages weight of a learned model selected by the machine learning model storing unit 231 as an initial value of weight (an machine learning initial value) for performing the machine learning of the NN of the NN controller 121. The machine learning model database stores the lens individual information, the user-request information, the reward information, and the machine learning model in association with each other. The reward information stored in the machine learning model database may be an identification number of the reward information stored in the reward information database, or the like.

The operation log storing unit 222 stores operation log information related to the drive control of the focus lens 101 according to the drive command. The storage device of the learning unit 220 stores programs for implementing the various components of the learning unit 220, various information stored by each component of the learning unit 220, such as the operation log information stored by the operation log storing unit 222, various databases, and the like.

<Recording and Displaying of Photographed Image>

Recording and displaying of the photographed image in the camera system shown in FIG. 1 will be described. The light incident on the lens 100 passes through a focus lens 101, a zoom lens 102, a diaphragm unit 103 and an image stabilizing lens 104 and is imaged on the image pickup element 201. The light imaged on the image pickup element 201 is converted into an electric signal by the image pickup element 201, converted into a digital signal by the A/D conversion circuit 202, and converted into the image data by the signal processing circuit 203. The image data output from the signal processing circuit 203 is recorded in the storage 204. The display unit 205 displays the image based on the image data output from the signal processing circuit 203.

<Focus Control>

Next, a method in which the camera body 200 controls the focus of the lens 100 will be described. The controller 211 performs an AF (Auto Focus) control based on the image data output from the signal processing circuit 203.

Specifically, the controller 211 moves the focus lens 101 so as to focus the focus lens 101 on the photographed subject so that the contrast of the image data become maximum. First, the controller 211 outputs a focus driving amount for moving the focus lens 101 to the communication unit 212 as the drive command. When the communication unit 212 receives the drive command from the controller 211, the communication unit 212 converts the drive command for the focus drive into a control command, and transmits the control command to the lens 100 via a communication contact portion of the mount 300.

When the communication unit 126 of the lens 100 receives the control command from the communication unit 212, the communication unit 126 converts the control command into a drive command for the focus drive, and outputs the drive command to the controller 121 via the NN controller 125. The NN controller 121 determines a drive signal by using the drive command for the focus derive, a focus lens position detected by the focus lens detector 106, and an image pickup condition described later as inputs to the NN, and outputs the drive signal to the focus lens driving device 105. Here, the NN used for the determination of the drive signal has the weight of the learned model stored in the NN data storage unit 123, so that the same processing as processing performed by the learned model can be performed. Therefore, the NN can output the driving amount of the focus in accordance with the configuration of the lens 100 and the request from the user according to the tendency of learning.

Thus, the focus lens 101 is driven in accordance with the drive command from the controller 211. According to such an operation, the controller 211 can perform suitable AF control by moving the focus lens 101 so that the contrast of the image data becomes maximum. Further, by using the NN having the weight of the learned model to determine the drive signal, the AF control can be performed in accordance with the configuration of the lens 100 and the request from the user.

<Diaphragm Control>

Next, a method in which the camera body 200 controls the diaphragm of the lens 100 will be described. The controller 211 performs an exposure control based on the image data output from the signal processing circuit 203. Specifically, the controller 211 determines a target f-number so that the luminance value of the image data become constant. The controller 211 outputs the determined f-number to the communication unit 212 as a drive command. When the communication unit 212 receives the drive command from the controller 211, the communication unit 212 converts the drive command of the f-number into a control command, and transmits the control command to the lens 100 via the communication contact portion of the mount 300.

When the communication unit 126 of the lens 100 receives the control command from the communication unit 212, the communication unit 126 converts the control command into an drive command of the f-number, and outputs the drive command to the controller 125. The controller 125 determines a drive signal based on the drive command of the f-number and the f-number of the diaphragm detected by the diaphragm detector 110, and outputs the drive signal to the diaphragm driving device 109. As described above, the f-number is controlled so that the luminance value of the image data become constant, and the suitable exposure control can be performed.

<Zoom Control>

Next, a method in which the camera body 200 controls the zoom of the lens 100 will be described. First, the user performs a zoom operation via operation unit 206. The controller 211 determines a zoom drive amount for moving the zoom lens 102 based on the zoom operation amount output from the operation unit 206, and outputs the zoom drive amount as a drive command to the communication unit 212. When the communication unit 212 receives the drive command from controller 211, The communication unit 212 converts the drive command for the zoom drive into a control command and transmits the control command to the lens 100 via the communication contact portion of the mount 300.

When the communication unit 126 of the lens 100 receives the control command from the communication unit 212, the communication unit 126 converts the control command into a drive command of the zoom drive and outputs the drive command to the controller 125. The controller 125 determines a drive signal based on the drive command for the zoom drive and the zoom lens position detected by the zoom lens detector 108, and outputs the drive signal to zoom lens driving device 107. As described above, the zoom lens 102 is driven according to the zoom operation input to the operation unit 206, and the user can operate the zoom.

<Vibration Isolation Control>

Next, a method in which the lens 100 performs vibration isolation control will be described. The controller 125 determines an image stabilizing lens target position so as to cancel the shake of the lens 100 based on the shake signal of the lens 100 output from the shake sensor 111. The controller 125 determines a drive signal based on an image stabilizing lens position detected by the image stabilizing lens detector 113 and the determined image stabilizing lens target position, and outputs the drive signal to the image stabilizing lens driving device 112. As described above, the vibration isolation is correctly controlled, and the image shake photographed by the image pickup element 201 can be prevented.

<Four Indicators Required for Focus Lens Control>

Next, matters required for the focus lens control will be described. There are four request items for the focus lens control: positioning precision, velocity, power consumption and quietness. In the focus lens control, it is required to control each request items in a well-balanced manner. The respective request items will be described below.

<Positioning Precision Required for Focus Lens Control>

Figure 2A:
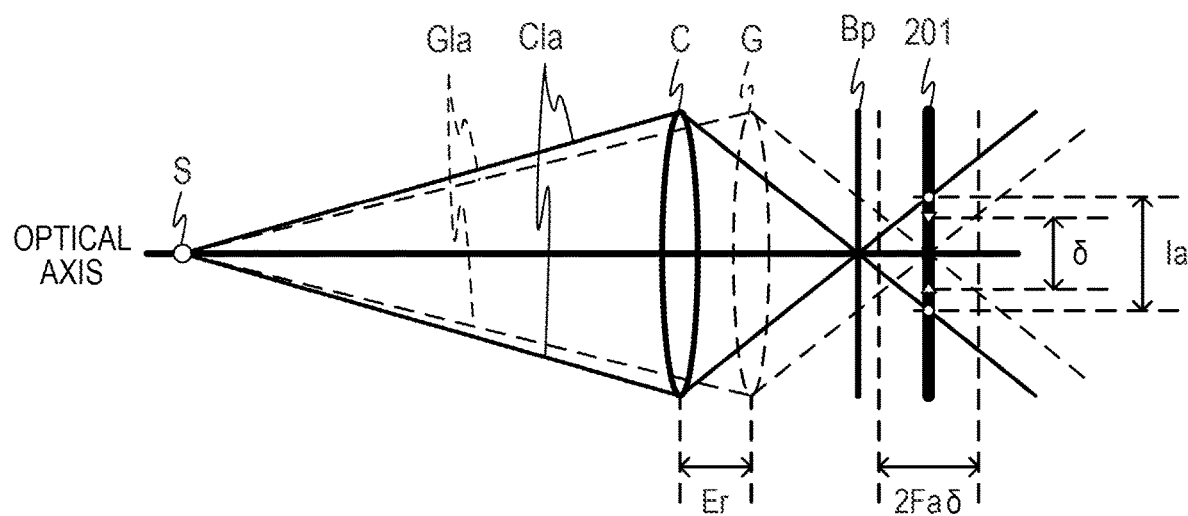
FIG. 2A is a view illustrating an positioning precision that is required for focus lens control.
Figure 2B:
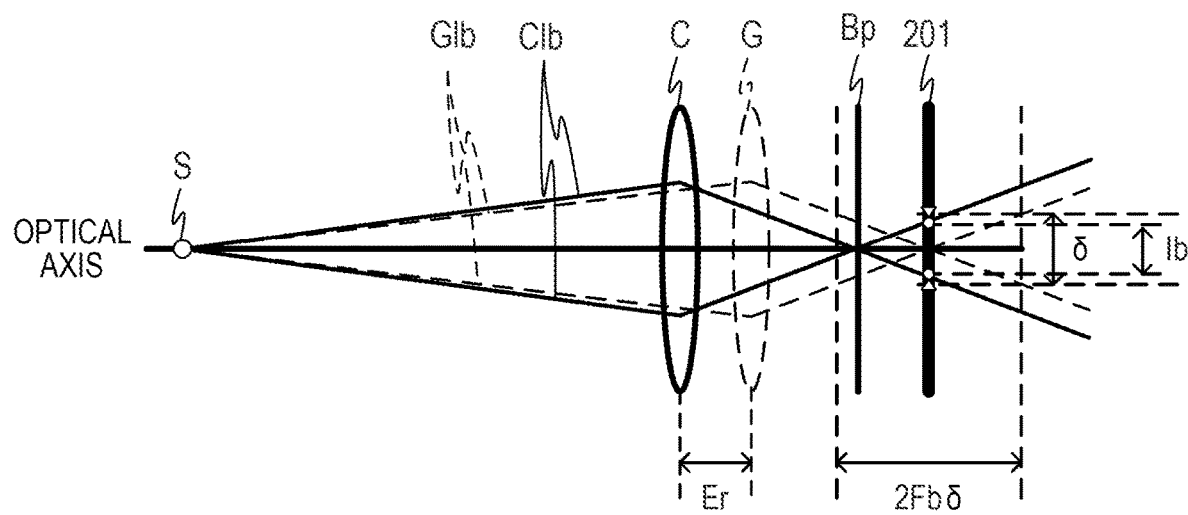
FIG. 2B is a view illustrating an positioning precision that is required for the focus lens control.

The positioning precision related to the focus lens control is an index indicating how precisely the focus lens can be driven with respect to a target position when the focus lens is driven to the target position. The positioning precision related to the focus lens control will be described referring to FIG. 2A and FIG. 2B. FIG. 2A shows the relationship between the focus lens and the focus position when the depth of focus is shallow and FIG. 2B shows the relationship when the depth of focus is deep. FIG. 2A and FIG. 2B show the relationship between the focus lens and the focus position in cases where the lens configurations are the same and only the f-numbers are different. In FIG. 2A and FIG. 2B, the same reference numerals are given to the common components.

In FIG. 2A and FIG. 2B, the focus lens target position G indicates a focus lens position where an image of a point-object S as a main subject on the optical axis focuses on the image pickup element 201. On the other hand, the focus lens position C indicates a focus position after driving the focus lens toward the focus lens target position G as the target. The focus lens position C is positioned on the point object S side by the control error Er with respect to the focus lens target position G. The focus position Bp indicates the imaging position of the point object S when the focus lens position is the focus lens position C. A circle of confusion $\delta$ indicates a circle of confusion on the image pickup element 201.

The f-number Fa in FIG. 2A is a brighter value (smaller value) than the f-number Fb in FIG. 2B. Therefore, a depth of focus $2Fa\delta$ in FIG. 2A is narrower than a depth of focus $2Fb\delta$ in FIG. 2B. Rays Cla and rays Gla in FIG. 2A represent the outermost rays among rays from the point object S at the focus lens position C and the focus lens target position G, respectively. Rays Clb and rays Glb in FIG. 2B are the outermost rays among rays from the point object S at the focus lens position C and the focus lens target position G, respectively.

In FIG. 2A, the point image diameter Ia indicates the diameter of the point image of the point object S on the image pickup element 201 when the focus lens is in focus lens position C. In FIG. 2B, the point image diameter Ib indicates the diameter of the point image of the point object S on the image pickup element 201 when the focus lens is at the focus lens position C.

Here, in FIG. 2A, the focus position Bp is outside the range of the depth of focus $2Fa\delta$, and the point image diameter Ia is larger than the circle of confusion $\delta$, so that the light does not fall within the central pixel but enters the adjacent pixel. As described above, in FIG. 2A, the point object S is brought into non-in-focus when the focus lens is positioned at the focus lens position C. On the other hand, in FIG. 2B, the focus position Bp is in the range of the depth of focus $2Fb\delta$, the point image diameter Ib is smaller than the circle of confusion $\delta$, so that all the light rays are focused on the central pixel. Thus, in FIG. 2B, the point object S is brought into in-focus when the focus lens is position at the focus lens position C.

As described above, even if the same positioning precision is achieved, a focus state changes to non-in-focus or in-focus according to an image pickup condition such as an f-number. From this, it can be seen that the positioning precision required for the focus lens control varies according to the image pickup condition.

<Velocity Required for Focus Lens Control>

Next, velocity related to the focus lens control will be described referring to FIG. 3A and FIG. 3B. Here, the velocity related to the focus lens control means a moving velocity when driving the focus lens (driving velocity of the focus lens). The moving velocity can be replaced by a moving amount by considering the moving velocity as the moving amount per unit time. Also, an moving amount of a position where the focus is placed in the optical axis direction is defined as a focus moving amount, and the moving velocity of it is defined as focus moving velocity. The focus lens moving amount is proportional to the focus moving amount. The proportional constant of the focus lens moving amount and the focus moving amount is called the focus sensitivity. The focus sensitivity varies depending on the positional relationship of the optical system configured by the lens (the configuration of lens apparatus). The relationship among the focus moving amount $\Delta Bp$, the focus sensitivity Se, and the focus lens moving amount $\Delta P$ can be expressed by the formula: the focus moving amount $\Delta Bp$=the focus sensitivity Se×the focus lens moving amount $\Delta P$ (Equation 1).

Figure 3A:
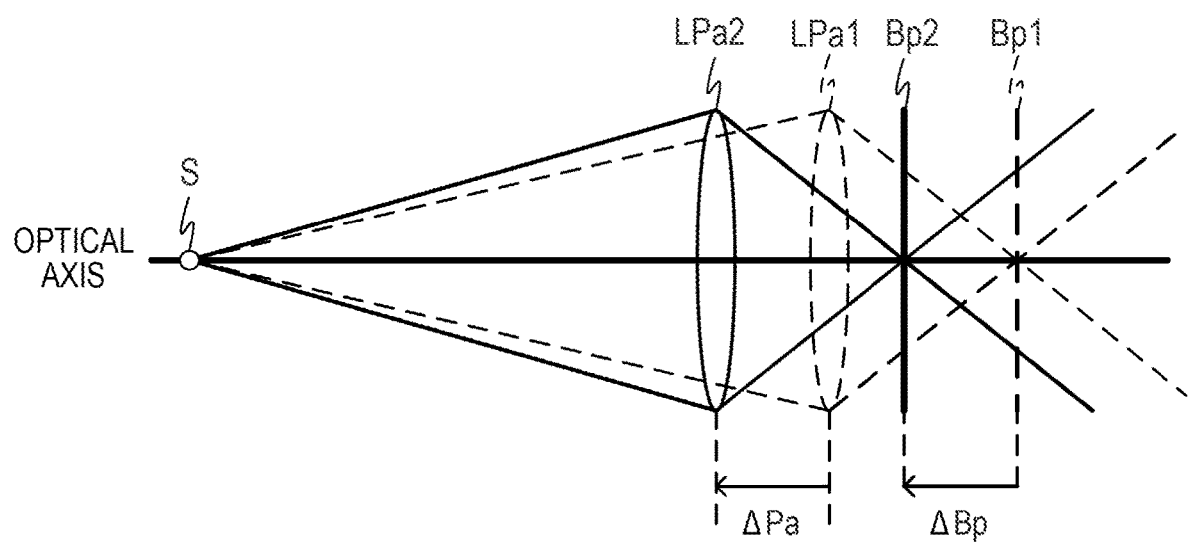
FIG. 3A is a view for describing an velocity that is required for the focus lens control.
Figure 3B:
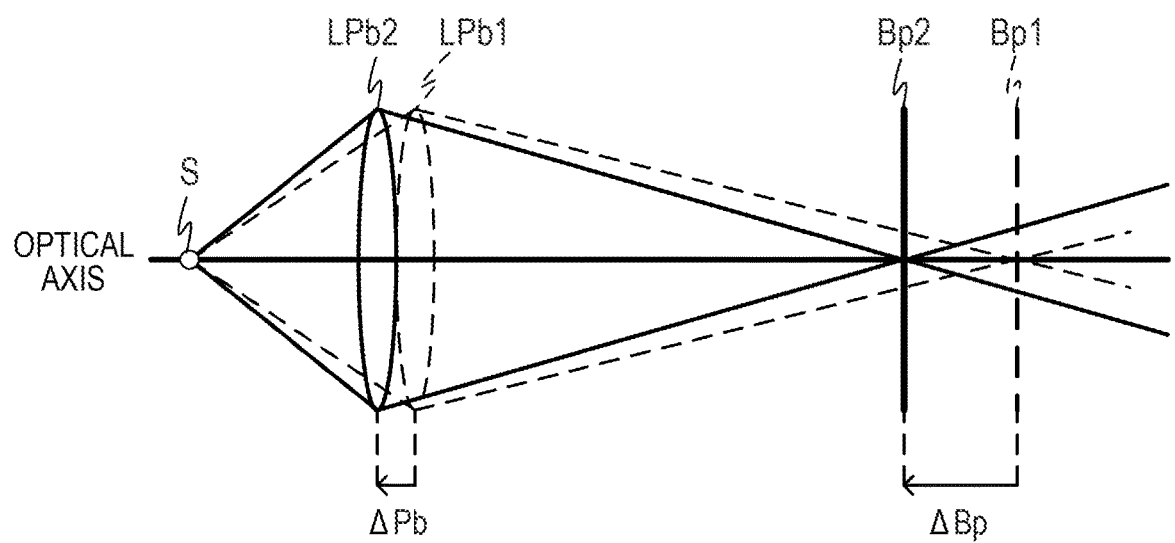
FIG. 3B is a view for describing an velocity that is required for the focus lens control.

FIG. 3A shows the relationship between the focus lens and the focus position when the focus sensitivity Se is small, and FIG. 3B shows the relationship between the focus lens and the focus position when the focus sensitivity Se is large. FIG. 3A and FIG. 3B show the cases where the lens configurations are the same and the distances between the lens and the point object S are different. In FIG. 3A and FIG. 3B, the same reference numerals are given to the common components.

In FIG. 3A, when the focus position is moved from a focus position Bp1 to a focus position Bp2, it is necessary to move the focus lens from the focus lens position LPa1 to the focus lens position LPa2. At this time, the relationship between a moving amount ΔPa of the focus lens and a focus moving amount ΔBp is as shown in Equation 1. Similarly, in FIG. 3B, when the focus position is moved from a focus position Bp1 to a focus position Bp2, it is necessary to move the focus lens from the focus lens position LPb1 to the focus lens position LPb2. At this time, the relationship between a moving amount ΔPb of the focus lens and the focus moving amount ΔBp is also expressed by Equation 1.

As shown in FIG. 3A and FIG. 3B, when the focus sensitivity Se is smaller, a moving amount ΔP of the focus lens required to move the focus position by the same focus moving amount ΔBp becomes larger. That is, compared with the case shown in FIG. 3A, in the case shown in FIG. 3B, since the focus moving amount ΔBp per unit time can be reduced, as a result, the focus moving velocity can be made the same even if the focus lens driving velocity is reduced.

As described above, the focus lens driving velocity required to achieve a specific focus movement velocity varies according to the image pickup condition such as the focus sensitivity. From this, it can be seen that the required focus lens driving velocity varies according to the image pickup condition.

<Power Consumption Required for Focus Lens Control>

The power consumption related to the focus lens control is a power consumed for driving the focus lens. The power consumption varies according to the driving time, the driving velocity, and the driving acceleration of the focus lens. For example, when the driving time is long, when the driving velocity is fast, and when there are many changes in the driving acceleration, the power consumption increases. On the other hand, by reduce the power consumption, a battery capacity can be effectively utilized, and as an advantage, the number of images that can be photographed with one charge can be increased and the battery can be further miniaturized.

<Quietness Required for Focus Lens Control>

The quietness related to the focus lens control is an index of a driving sound when the focus lens is driven. When the focus lens is driven, a driving sound is generated by vibration, friction, etc. The drive sound varies according to a change in the driving velocity or the drive acceleration. For example, when the driving velocity is fast or there are many changes in the driving acceleration, the driving sound becomes large. Further, the longer the time when the focus lens stops, the longer the time when the driving sound is not generated.

<Relationship of Positioning Precision with Velocity, Power Consumption and Quietness>

Figure 4A:
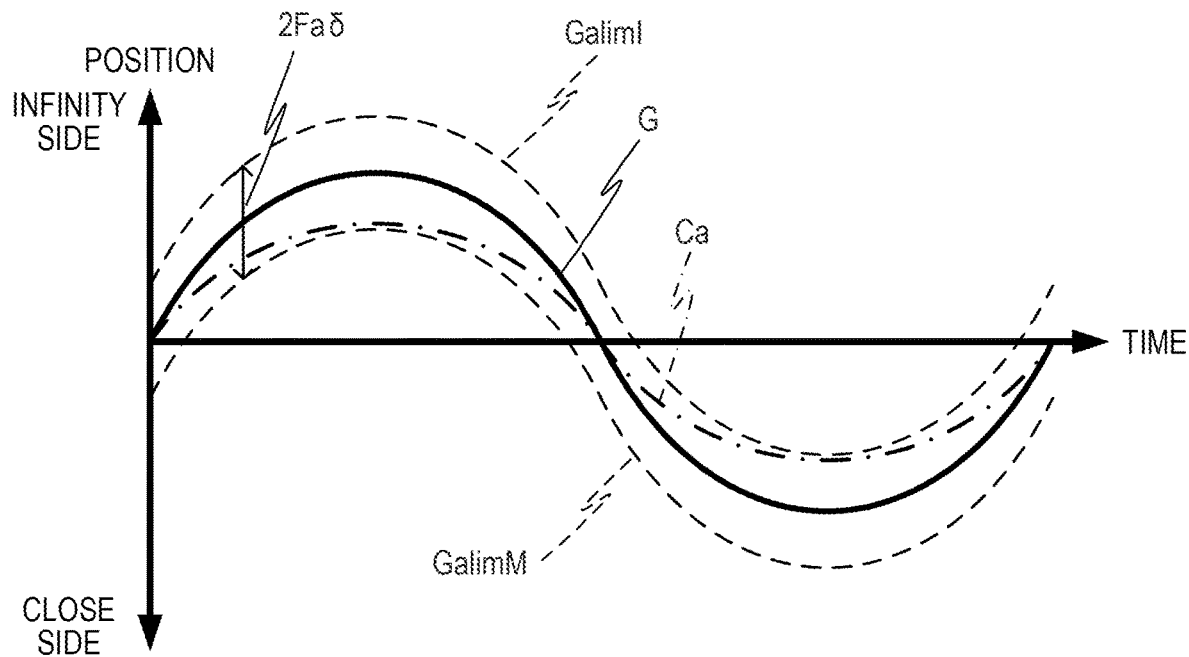
FIG. 4A is a view for describing the relationships between the positioning precision and the velocity, the power consumption, and the quietness.
Figure 4B:
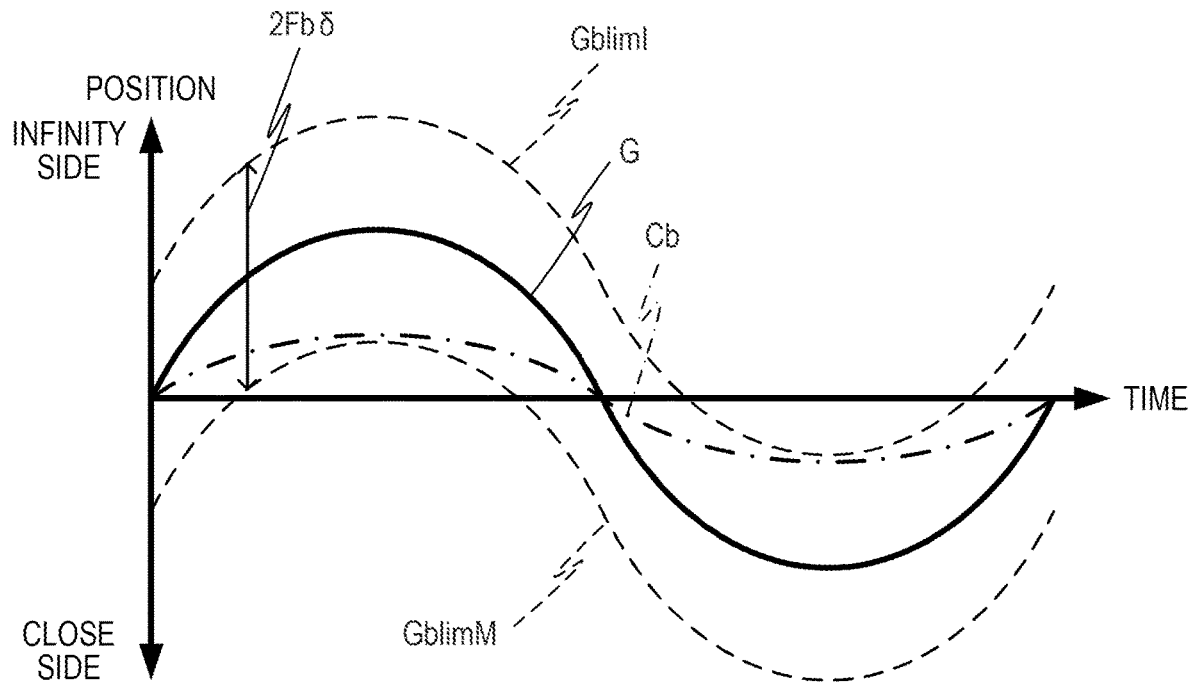
FIG. 4B is a view for describing the relationships between the positioning precision and the velocity, the power consumption, and the quietness.

Next, the relationships between the positioning precision related to the focus lens control and the velocity, the power consumption, and the quietness related to the focus lens control will be described referring to FIG. 4A and FIG. 4B. FIG. 4A shows an example of the changes of the focus lens control to continue focusing on a moving subject when the depth of focus is shallow, and FIG. 4B shows an example of the changes when the depth of focus is deep. In FIG. 4A and FIG. 4B, the horizontal axis indicates the time passage, and the vertical axis indicates the position of the focus lens. Here, in FIG. 4A and FIG. 4B, when the focus lens position goes to the upper side of the paper, the focus is aligned in the infinite direction, and when it goes to the lower side of the paper, the focus is aligned in the close direction. In FIG. 4A and FIG. 4B, the same reference numerals are given to the common components.

In FIG. 4A and FIG. 4B, the focus lens target position G indicates a focus lens position when an image of the subject is focused on the image pickup element 201. The depth of focus in FIG. 4A and FIG. 4B are indicated as 2Faδ and 2Fbδ, respectively. In FIG. 4A, with reference to a focus lens target position G, a focus lens position serving as a boundary of the focus position on the infinite side of the depth of focus is indicated by a position GalimI, and a focus lens position serving as a boundary of the focus position on the close side is indicated by a position GalimM. Similarly, in FIG. 4B, with reference to the focus lens target position G, a focus lens position serving as a boundary of the focus position on the infinite side of the depth of focus is indicated by a position GblimI, and a focus lens position serving as a boundary of the focus position on the close side is indicated by a position GblimM. FIG. 4A and FIG. 4B show focus lens positions Ca and Cb, respectively, controlled so that the subject is within the depth of focus.

In the case shown in FIG. 4B, since the depth of focus is deep, even if the focus lens is controlled according to a trajectory indicated by the focus lens position Cb, the image of the subject does not deviate from depth of focus. On the other hand, in the case shown in FIG. 4A, since the depth of focus is shallow, a trajectory of the focus lens position Cb needs to be controlled according to a trajectory having less deviation from the focus lens target position G than in the case shown in FIG. 4B.

In the cases shown in FIG. 4A and FIG. 4B, the subject does not come out of focus, but the control of the focus lens position Cb shown in FIG. 4B can reduce the driving amount and the driving velocity more than the control of the focus lens position Ca shown in FIG. 4A. As described above, under the condition where the required positioning precision is low, the focus lens can be controlled at low velocity, low power consumption, and quieter state.

<Relationship of Velocity with Positioning Precision, Power Consumption and Quietness>

Figure 5A:
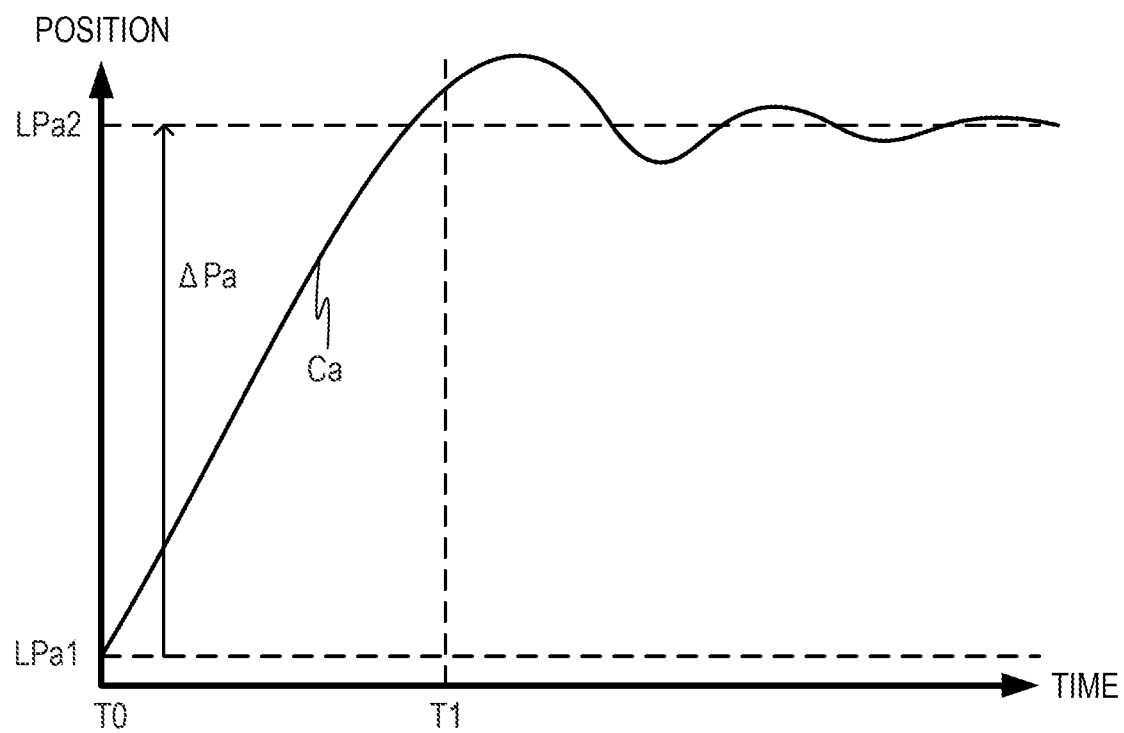
FIG. 5A is a view for describing the relationships between the velocity and the positioning precision, the power consumption, and the quietness.
Figure 5B:
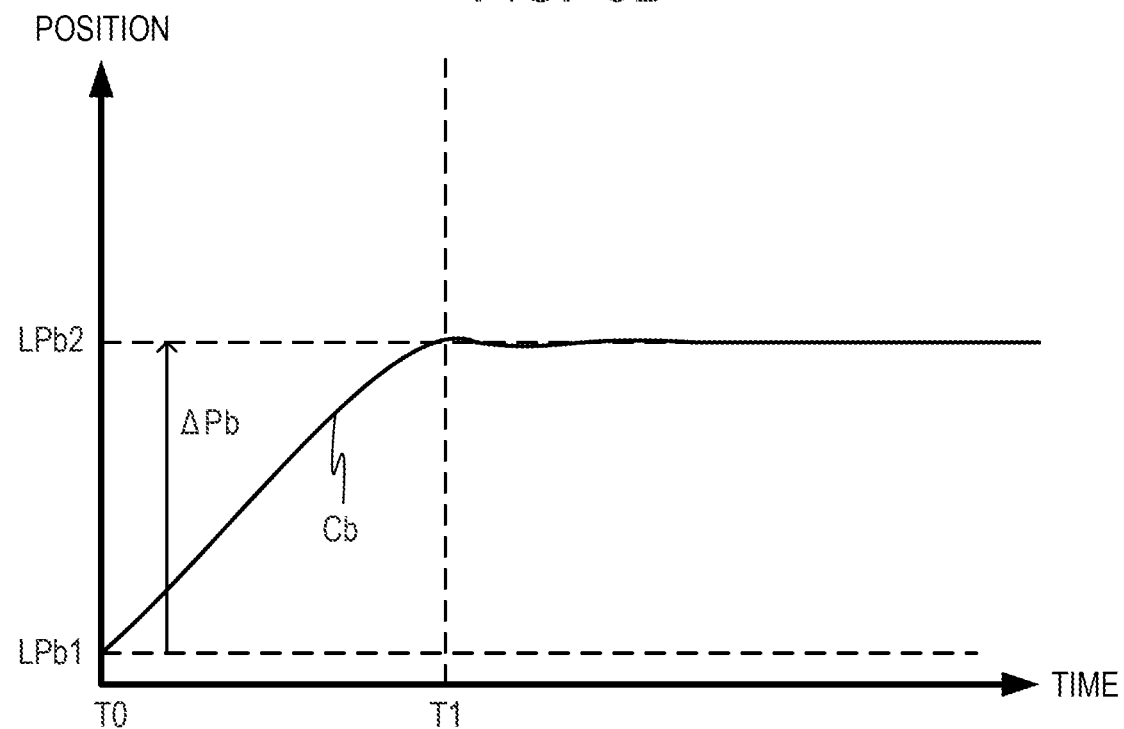
FIG. 5B is a view for describing the relationships between the velocity and the positioning precision, the power consumption, and the quietness.

Next, the relationships between the velocity related to the focus lens control and the positioning precision, the power consumption and the quietness related to the focus lens control will be described referring to FIG. 5A and FIG. 5B. In FIG. 5A and FIG. 5B, the horizontal axis indicates the time passage, and the vertical axis indicates the position of the focus lens. FIG. 5A shows changes of the focus lens position Ca driven from the focus lens position LPa1 to the focus lens position LPa2 shown in FIG. 3A during a time period T0 to T1. Similarly, FIG. 5B shows changes of the focus lens position Cb driven from the focus lens position LPb1 to the focus lens position LPb2 shown in FIG. 3B during the time period T0 to T1. In FIG. 5A and FIG. 5B, the slope of the changes of the focus lens positions Ca and Cb indicates the focus lens velocity.

Here, as shown in FIG. 3A and FIG. 3B, the focus moving amount ΔBp when moving the focus lens from the focus lens position LPa1 to the focus lens position LPa2 is the same as the focus moving amount ΔBp when moving the focus lens from the focus lens position LPb1 to the focus lens position LPb2. On the other hand, the slope of the changes of the focus lens position Ca shown in FIG. 5A is larger than the slope of the changes of the focus lens position Cb shown in FIG. 5B, and it can be seen that the focus lens velocity is faster in the example shown in FIG. 5A.

As shown in FIG. 5A and FIG. 5B, with respect to the focus lens driving velocity for moving the focus by the same focus moving amount ΔBp during the time period T0 to T1, it is necessary to move the focus lens faster in the control of the focus lens position Ca than in the control of the focus lens position Cb. Since the velocity is fast in the control of the focus lens position Ca, a certain amount of time is required for stabilizing the position after the focus lens reaches the focus lens position LPa2 as the target position. On the other hand, since the velocity is slow in the control of the focus lens position Cb, the position is stabilized immediately after the focus lens reaches the focus lens position LPb2 as the target position. This affects the positioning precision. Further, in the control of the focus lens position Ca, since the focus lens is driven quickly, the acceleration change becomes large at the stopping time, so that the power consumption becomes larger and the drive sound becomes larger than in the control of the focus lens position Cb. Therefore, under the condition where the required velocity is low, the focus lens can be controlled under the conditions of the high positioning precision, the low power consumption, and the quieter state.

<Lens Apparatus Information>

Next, the lens apparatus information related to the image pickup condition will be described. The lens apparatus information is information on the image pickup condition in the lens apparatus, which affects photographed images. In the present embodiment, in order to control the request items for the focus lens control in the well-balanced manner, the focus lens control is performed based on the lens apparatus information for determining the positioning precision and the velocity required for the focus lens control. The lens apparatus information is determined by the lens apparatus management unit 122. The lens apparatus information includes, for example, the depth of focus and the focus sensitivity.

The lens apparatus information management unit 122 can determine the depth of focus from the information of the current f-number and the circle of confusion, as shown in Equation 1. The lens apparatus information management unit 122 stores a conversion table (not shown) indicating the relationships between the focus sensitivity, and the focus lens position and the zoom lens position, and can determine the focus sensitivity from the focus lens position and the zoom lens position. The method of determining the depth of focus and the focus sensitivity may be determined by any known method.

As mentioned above, the request items of the focus lens control is affected by the image pickup condition. Therefore, by performing the focus lens control base on the lens apparatus information on the image pickup condition, it is possible to control the request items of the positioning precision, the velocity, the power consumption, and the quietness in a well-balanced manner in consideration of the influence of the photographed image according to the image pickup condition.

<NN Algorithm and Weight>

A method in which the NN controller 121 determines the drive command using the NN algorithm will be described below. As described above, the NN is implemented in the NN controller 121. The NN controller 121 refers to weight which is combining-weighting-factors of the learned model stored in the NN data storage unit 123, and uses the referred weight as weight of the NN. Thus, the NN controller 121 can use the NN as learned NN. The NN controller 121 determines the drive command using the learned NN, so that the NN controller 121 can determine the drive command according to the configuration of the lens 100 and the request from the user according to the tendency of learning of learned model.

Figure 6:
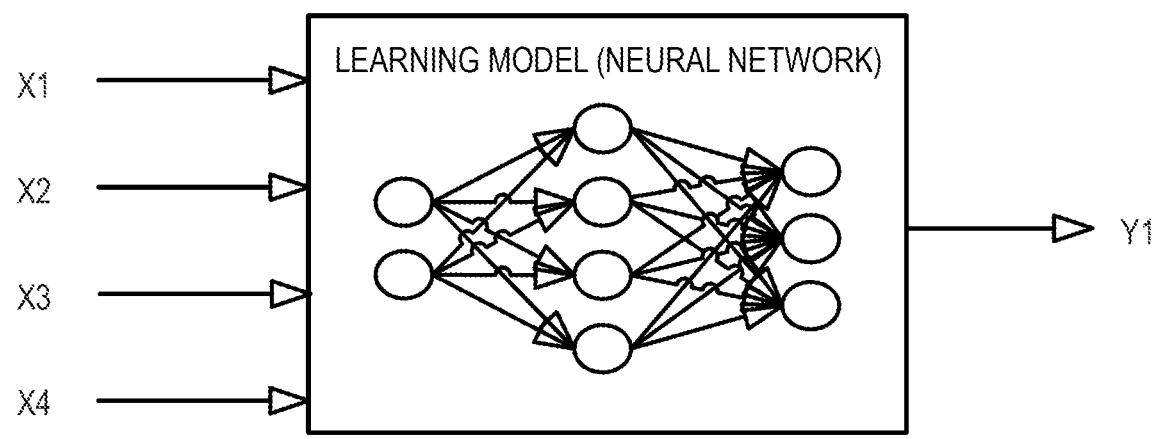
FIG. 6 is a view illustrating an example of input and output of a neural network.

FIG. 6 is a schematic diagram showing the input/output configuration of the NN controller 121 using the NN according to the present embodiment. The target position X1 is a drive command target position for the focus drive output from the controller 125. The current position X2 is the current position of the focus lens 101 obtained from the focus lens detector 106. The depth of focus X3 is depth of focus included in the lens apparatus information, and the focus sensitivity X4 is the focus sensitivity included in the lens apparatus information. The drive signal Y1 is a drive signal for the focus lens 101.

In this manner, in the present embodiment, the drive signal is determined as the an output of the learned model by using the drive command of the focus drive, the current position of the focus lens 101, the depth of focus, and the focus sensitivity as inputs to the learned model. The NN controller 121 can control the focus lens 101 in consideration of the influence of the photographed image according to the image pickup condition by using the lens apparatus information on the image pickup condition as an input to the NN.

<Flow of Photographing Processing>

Figure 7:
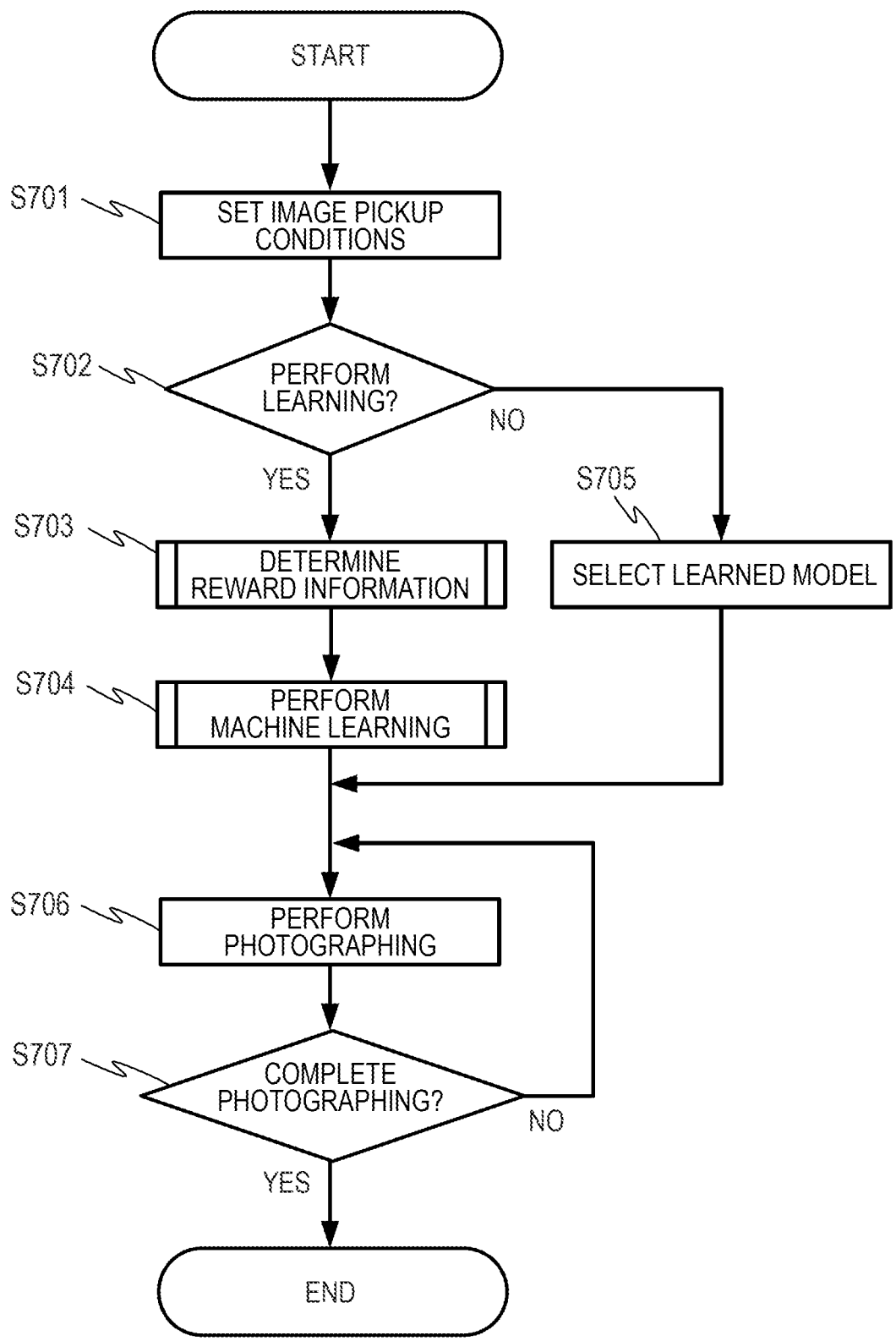
FIG. 7 is a flowchart showing a flow of a series of photographing processing according to the first embodiment.

Next, a series of a photographing processing according to the present embodiment will be described referring to FIG. 7. FIG. 7 is a flowchart showing a flow of the series of the photographing processing according to the present embodiment. In the present embodiment, when the photographing processing is started in accordance with the operation of the user, the process proceeds to step S701.

In step S701, an image pickup condition that affects control using the NN is set. For example, the controller 211 according to the present embodiment performs an exposure control based on the image data output from the signal processing circuit 203 and sets the f-number in step S701. Setting the f-number sets the depth of focus. The f-number may be set in accordance with the operation of operation unit 206 by the user.

In step S702, the controller 211 determines whether or not to perform machine learning in response to the operation of the operation unit 206 by the user. If the controller 211 determines that the machine learning is to be performed, the process proceeds to step S703.

In step S703, the reward information related to the learning of the NN used for the focus lens control according to the present embodiment is determined. As described above, in the present embodiment, as the machine learning processing, an evaluation value of the operation according to the reward information based on the device restriction information of each lens apparatus and the request information from the user is set as the reward, and the enhanced learning is applied to the NN so that the reward becomes maximum. In this regard, in the present embodiment, the reward information is determined according to the configuration of the lens 100 and the request from the user prior to the machine learning processing. Specifically, the device constraint reward management unit 224, the user-request reward management unit 225, and the reward management unit 223 determine the reward information based on the lens individual information and the user-request information set by the user. The details of the reward information and the determination processing of the reward information will be described later. When the reward information is determined in step S703, the process proceeds to step S704.

In step S704, the learning unit 220 performs the machine learning processing on the NN. As described above, when the machine learning is performed using the lens apparatus, a large number of drives are required during the machine learning, and the driving device may be worn, which may lead to performance deterioration of the driving device. Further, since a large amount of time is required for the machine learning, a burden may be imposed on the user, for example, the user cannot take a picture when he/she actually wants to take the picture. Thus, in the present embodiment, the learning unit 220 selects the learned model to which the learning has been performed using the reward information corresponding to a configuration and a request similar to the configuration of the lens 100 and the request of the user from among the plurality of learned models to which the learning has been performed in advance. The learning unit 220 uses the weight of the selected learned model as an initial value of the weight of the NN.

After that, the learning unit 220 obtains the operation log information of the focus control by using the lens 100 provided with the NN to which the initial value of the weight is set, and performs additional learning in which the evaluation value of the focus control is set as the reward based on the reward information determined in step S703. As described above, in the present embodiment, the so-called transition learning is performed by using the learned model to which the learning has been performed using the reward information corresponding to a configuration and a request coincident with or similar to the configuration of the lens 100 and the request of the user, so that the number of driving times of the driving device during the machine learning can be reduced. Therefore, the wear of the driving device in the machine learning can be suppressed, and the time related to the machine learning can be shortened. The details of the machine learning processing will be described later.

On the other hand, if the controller 211 determines that the machine learning is not to be performed in step S702, the process proceeds to step S705. In step S705, the controller 211 selects the learned model to be used for the NN controller 121 according to the operation of the user. For example, the display unit 205 displays learned models stored in the machine learning model database stored by the machine learning model storing unit 231 as options of the learned models. The user can select a learned model to be used from the options of the learned models displayed on the display unit 205, and the NN controller 121 can use the weight of the selected learned model as the weight of the weight to perform the drive control according to the learning tendency. Here, when the display unit 205 displays the options of the learned models, as an explanation of the learned models, the user-request information or the like used in the learning may be displayed.

Note that the selection of the learned model in step S705 may be performed so as to automatically select a learned model used last time. In this case, the selection by the user can be omitted, and the trouble of the operation by the user can be reduced. The controller 211 may also automatically select, for example, a learned model to which the learning has been performed using a lens apparatus of the lens model that matches or is similar to the lens model of the lens 100 and data obtained in an image pickup condition which is similar to the image pickup condition set in step S701. When the processing in step S704 or step S705 is completed, the process proceeds to step S706.

In step S706, a photographing processing is performed according to the operation of the user. In the photographing processing, the zoom, the shake correction and the AF focus control by the NN controller 121 are performed according to the operation of the user. In accordance with the operation of the user, the image data is obtained using the image pickup element 201, image data is stored in the storage 204, and an image is display in the display unit 205.

In step S707, the controller 211 determines whether or not an instruction to end photographing has been input from the user via the operation unit 206. If it is determined by the controller 211 that the instruction to end the photographing is not input, the processing returns to step S706, and the photographing processing is continued. On the other hand, if it is determined by the controller 211 that an instruction to end the photographing is input, the controller 211 ends the series of the photographing processing.

In such a series of the photographing processing according to the present embodiment, the weight of the learned model to which the learning has been performed in advance is used as the initial value of the weight of the NN, so that the number of the driving device times of the driving in the learning of the NN can be reduced and the wear of the driving device can be suppressed. Also, the time related to the machine learning can be shortened, and the burden on the user can be reduced. Further, when setting the initial value of the weight of the NN, weight of a learned model to which the learning has been performed by using reward information corresponding to a request coincident with or similar to the request of the user is referred to, so that the focus control according to the request of the user can be realized.

In the present embodiment, the setting of the image pickup condition is performed before the performance determination of the machine learning, but the timing of the setting of the image pickup condition is not limited to this. The setting of the image pickup condition may be performed prior to the machine learning processing in step S704 and the selection of the learned model in step S705. Therefore, for example, the setting of the image pickup condition may be performed after the performance determination processing of the machine learning in step S702 or the determination processing of the reward information in step S703.

<Reward Information>

Next, the reward information will be described in detail referring to FIG. 8 and FIG. 9. The reward information is information serving as a criteria of the score for scoring (evaluating) the control result of the NN algorithm obtained from the operation log information. For the control result of the NN algorithm, the reward information has information of a boundary value of scores and the score assigned to each of ranges divided by the boundary value. The reward information will now be described referring to FIG. 8.

Figure 8:
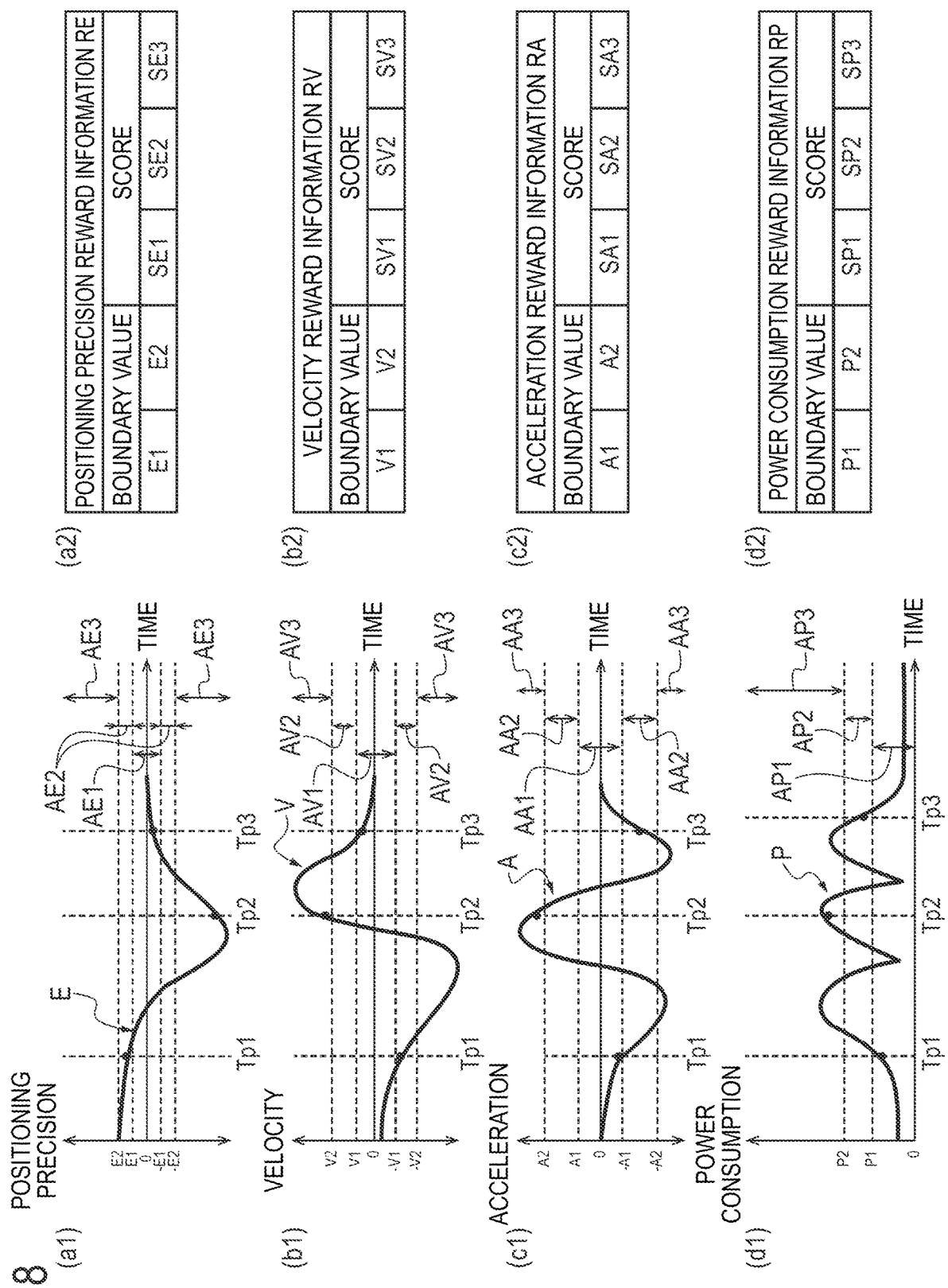
FIG. 8 is a view illustrating an example of reward information according to the first embodiment.

(a1), (b1), (c1) and (d1) of FIG. 8 respectively show examples of the relationships between the changes with the time passage in the learning and the boundary value of the score for the positioning precision, the velocity, the acceleration, and the power consumption, which are items indicating the control result of the NN algorithm. Here, the horizontal axes in (a1), (b1), (c1) and (d1) of FIG. 8 show the time passage.

(a2), (b2), (c2), and (d2) of FIG. 8 show examples of a data structure of the reward information for the positioning precision, the velocity, the acceleration, and the power consumption, respectively. The data of the reward information includes a plurality of boundary values and scores obtained in ranges that are divided by the boundary values. In the present embodiment, an example where the data of the reward information includes two boundary values and three scores will be described.

Since the learning of the NN is performed so that the obtained score (evaluation value) of the control result has a high score, the learning is performed so that the closer the boundary value is to the target of each item as an object to be evaluated, the more precise control is performed. For example, the learning is performed so that the closer the boundary value of the positioning precision to 0, the more precise control for the positioning precision is performed. It is also possible to indicate that the item has a higher priority of the learning than other items by setting the score higher than other items in the reward information. For example, by setting the score of the power consumption higher than the positioning precision, the learning is performed so that power consumption is given priority over the positioning precision.

The vertical axis shown in (a1) of FIG. 8 shows the value of the positioning precision E which is the difference between the target position and the current position of the focus lens. The positive direction of the positioning precision E indicates a case where the current position is on the infinite side with respect to the target position, and the negative direction of the positioning precision E indicates a case where the current position is on the close side with respect to the target position. In (a1) of FIG. 8, the closer the positioning precision E is to 0, the higher positioning precision is achieved in the drive control.

(a2) of FIG. 8 shows an example of the data structure of the positioning precision reward information RE which is the reward information of the positioning precision. In the present embodiment, the positioning precision reward information RE includes boundary values E1 and E2 which define reward ranges of the positioning precision, and scores SE1, SE2 and SE3 which can be obtained within the reward ranges.

The boundary values E1 and E2 represent the respective boundary values of the scores given as the reward of the positioning precision E. Here, a range of −E1 to E1 is defined as a range AE1, a range of −E2 to E2 excluding the range AE1 is defined as a range AE2, and the range other than the range AE1 and the range AE2 is defined as a range AE3. When the positioning precision E falls within the ranges AE1, AE2 and AE3, the scores SE1, SE2 and SE3 shown in (a2) of FIG. 8 are given as the reward, respectively. Here, the relationship among the scores SE1, SE2, and SE3 is set so that the score SE1>the score SE2>the score SE3, and the closer the positioning precision E is to 0, the higher score is obtained.

As shown in (a1) of FIG. 8, the positioning precision E at arbitrary times Tp1, Tp2, and Tp3 falls within the ranges AE2, AE3, and AE1, respectively. Therefore, at arbitrary times Tp1, Tp2 and Tp3, the rewards that can be obtained become the scores SE2, SE3 and SE1, respectively.

Here, for example, a value of ±Fδ/2 may be set for the boundary value E1, and a value of ±Fδ may be set for the boundary value E2. In this case, if the current position is controlled within the depth of focus with respect to the target position of the focus lens, a high score is added, and if the current position is outside the depth of focus, a low score is added. Further, the closer the focus lens is to the target position, the higher score can be obtained.

Next, the vertical axis in (b1) of FIG. 8 shows the value of the driving velocity V of the focus lens. The positive direction of the driving velocity V indicates the driving velocity in the infinite direction, and the negative direction of the driving velocity V indicates the driving velocity in the close direction. The closer the driving velocity V is to 0, the smaller the drive sound becomes.

(b2) of FIG. 8 shows an example of the data structure of the velocity reward information RV which is reward information of the velocity. In the present embodiment, the velocity reward information RV includes boundary values V1 and V2 which define reward ranges of the velocity, and scores SV1, SV2 and SV3 which can be obtained within the reward ranges.

The boundary values V1 and V2 represent the respective boundary values of the scores given as the reward of the driving velocity V. Here, a range of −V1 to V1 is defined as a range AV1, a range of −V2 to V2 excluding the range AV1 is defined as a range AV2, and the range other than the range AV1 and the range AV2 is defined as a range AV3. When the driving velocity V falls within the ranges AV1, AV2 and AV3, the scores SV1, SV2 and SV3 shown in (b2) of FIG. 8 are given as the reward, respectively. The relationship of the scores among the scores SV1, SV2, and SV3 is set so that the score SV1>the score SV2>the score SV3, and the closer the driving velocity V is to 0, the higher score is obtained.

As shown in (b1) of FIG. 8, the driving velocity V at the arbitrary times Tp1, Tp2, and Tp3 falls within the ranges AV2, AV3, and AV1, respectively. Therefore, at arbitrary times Tp1, Tp2, and Tp3, the rewards that can be obtained for the driving velocity V related to the drive sound becomes the scores SV2, SV3, and SV1, respectively.

Here, for example, the boundary values V1 and V2 are determined based on the relationship between the driving velocity and the driving sound, and the score is set so that the more slowly the driving velocity is controlled, the higher the obtained score becomes. In general, the slower the driving velocity is, the smaller the drive sound becomes, and therefore the control can be performed so that the higher the obtained score is, the greater emphasis is placed on the quietness.

Next, the vertical axis in (c1) of FIG. 8 shows the value of the driving acceleration A of the focus lens. The positive direction of the drive acceleration A indicates the drive acceleration in the infinite direction, and the negative direction of the drive acceleration A indicates the drive acceleration in the proximate direction. The closer the drive acceleration A is to 0, the smaller the drive sound becomes.

(c2) of FIG. 8 shows an example of the data structure of the acceleration reward information RA which is reward information of the acceleration. In the present embodiment, the acceleration reward information RA includes boundary values A1 and A2 which define reward ranges of the acceleration, and scores SA1, SA2 and SA3 which can be obtained within the reward ranges.

The boundary values A1 and A2 represent the respective boundary values of the scores given as the reward of the drive acceleration A. Here, a range of −A1 to A1 is defined as a range AA1, a range of −A2 to A2 excluding the range AA1 is defined as a range AA2, and the range other than the range AA1 and the range AA2 is defined as a range AA3. When the drive acceleration A falls within the ranges AA1, AA2, and AA3, the scores SA1, SA2, and SA3 shown in (c2) of FIG. 8 are given as the reward, respectively. The relationship of the scores among the scores SA1, SA2, and SA3 is set so that the score SA1>the score SA2>the score SA3, and the closer the drive acceleration A is to 0, the higher the score is obtained.

As shown in (c1) of FIG. 8, the drive acceleration A at arbitrary times Tp1, Tp2, Tp3 falls within the ranges AA1, AA3, AA2, respectively. Therefore, at arbitrary times Tp1, Tp2, and Tp3, the rewards that can be obtained for the drive acceleration A related to the drive sound becomes scores SA1, SA3, and SA2, respectively.

Here, for example, boundary values A1 and A2 are determined based on the relationship between the driving acceleration and the driving sound, and the score is set so that the smaller the driving acceleration is controlled, the higher the score which can be obtained is. In general, the smaller the drive acceleration is, the smaller the drive sound is, and therefore the control can be performed so that the higher the obtained score is, the greater the emphasis is placed on the quietness.

Next, the vertical axis in (d1) of FIG. 8 shows the value of the power consumption P of the focus lens. The closer the power consumption P is to 0, the smaller the power consumption becomes.

(d2) of FIG. 8 shows an example of the data structure of the power consumption reward information RP which is reward information of the power consumption. In the present embodiment, the power consumption reward information RP includes boundary values P1 and P2 which define reward ranges of the power consumption and scores SP1, SP2 and SP3 which can be obtained within the reward ranges.

The boundary values P1 and P2 represent the respective boundary values of the scores given as the reward of the power consumption P. Here, a range from 0 to P1 is defined as a range AP1, a range from P1 to P2 is defined as a range AP2, and the range other than the range AP1 and the range AP2 is defined as a range AP3. When the power consumption P falls within the ranges AP1, AP2, and AP3, the scores SP1, SP2, and SP3 shown in (d2) of FIG. 8 are given as the reward, respectively. Here, the relationship of scores among scores SP1, SP2, and SP3 is set so that the score SP1>the score SP2>the score SP3, and the closer power consumption P is to 0, the higher score is obtained.

As shown in (d1) of FIG. 8, the power consumption P at arbitrary times Tp1, Tp2, and TP3 falls within the ranges AP1, AP3, and AP2, respectively. Therefore, at arbitrary times Tp1, Tp2 and TN3, the rewards that can be obtained for power consumption P becomes the scores SP1, SP3 and SP2, respectively.

Here, for example, the boundary values P1 and P2 are arbitrarily determined, and the score is set so that the smaller the power consumption is controlled, the higher score which can be obtained is. Therefore, the control can be performed so that the higher the obtained score is, the greater emphasis is placed on the low power consumption.

As described above, the reward information for scoring the control results of the position control error, the velocity, the acceleration, the power consumption, and the like are set. The learning processing unit 221 uses the reward information to score the control results of the NN algorithm for each unit time based on the operation log information on the focus lens driving in the learning, and cumulates the scores for each unit time, so that the cumulative score (cumulative evaluation value) of the control results of the NN algorithm can be determined. Further, regarding the control result of the NN algorithm, by adding the respective scores of the position control error, the velocity, the acceleration, and the power consumption and setting the total score as the evaluation value, the control result as a total of the NN algorithm can be scored.

Here, the power consumption is used as one of the control results, however the reward information for power consumption may be set using the results of the velocity and the acceleration based on the relationship between the velocity and the acceleration and the power consumption.

In the present embodiment, the number of the boundary values is two, however the number of the boundary values is not limited to this, and may be three or more depending on a desired configuration, or the number of the boundary values may be variable as needed. In the present embodiment, the score is determined based on the boundary values, but the positioning precision E, the driving velocity V, the drive acceleration A, and the power consumption P may be converted into the score by using a conversion function for converting them into the score. In this case, the conversion function and its coefficient are set as reward information instead of the boundary values and the scores which can be obtained within the range divided by boundary value.

Here, in the present embodiment, in order to perform the learning in accordance with the configuration of the lens apparatus and the request of the user, the reward information includes the device constraint reward information based on the device restriction information of each lens apparatus and the user-request reward information based on the request information from the user. FIG. 9 shows an example of the data structures of the device constraint reward information and the user-request reward information included in the reward information according to the present embodiment.

First, the user-request reward information is the reward information that can be changed according to the user-request information set by the user. Note that the user-request information is converted to user-request reward information using the user-request reward conversion information as described above. The user-request reward conversion information is set for each lens model in advance, and stored in association with the lens model information in the user-request reward conversion information database stored by the user-request reward conversion information storing unit 229. The user-request reward conversion information may be, for example, a conversion table for converting the user-request information into the user-request reward information.

On the other hand, the device constraint reward information is reward information defining the minimum control to be observed by the device. Thus, while the device constraint reward information has a wider range defined by the boundary values than the range in the user-request reward information, the device constraint reward information has a lower score including a negative value if the control result deviates from the expected target. In the present embodiment, the device constraint reward information is set for each lens model in advance, and stored in association with the lens device information in the device constraint reward information database stored by the device constraint reward information storing unit 228. The device constraint reward information may be set, for example, based on the result of an experiment of the drive control for each lens model.

As shown in FIG. 9, in the present embodiment, the device constraint reward information includes the positioning precision reward information REb, the velocity reward information RVb, the acceleration reward information RAb, and the power consumption reward information RPb. The user-request reward information comprises the positioning precision reward information REu, the velocity reward information RVu, the acceleration reward information RAu, and the power consumption reward information RPu.

Here, the positioning precision reward information REb and the positioning precision reward information REu have the same data structure as the data structure of the positioning precision reward information RE shown in (a2) in FIG. 8. Specifically, the positioning precision reward information REb has boundary values Eb1 and Eb2, and has scores SEb1, SEb2, and SEb3 which can be obtained within ranges defined by the boundary values. The positioning precision reward information REu has boundary values Eu1 and Eu2 and has scores SEu1, SEu2, and SEu3 which can be obtained within ranges defined by the boundary values.

The velocity reward information RVb and the velocity reward information RVu have the same data structure as the data structure of the velocity reward information RV shown in (b2) of FIG. 8. Specifically, the velocity reward information RVb has boundary values Vb1 and Vb2 and has scores SVb1, SVb2 and SVb3 which can be obtained within ranges defined by the boundary values. The velocity reward information RVu has boundary values Vu1 and Vu2 and has scores SVu1, SVu2, and SVu3 which can be obtained within ranges defined by the boundary values.

The acceleration reward information RAb and the acceleration reward information RAu have the same data structure as the data structure of the acceleration reward information RA shown in (c2) of FIG. 8. Specifically, the acceleration reward information RAb has boundary values Ab1 and Ab2, and has scores SAb1, SAb2, and SAb3 which can be obtained within ranges defined by the boundary values. The acceleration reward information RAu has boundary values Au1 and Au2, and has scores SAu1, SAu2, and SAu3 which can be obtained within ranges defined by the boundary values.

The power consumption reward information RPb and the power consumption reward information RPu have the same data structures as the data structure of the power consumption reward information RP shown in (d2) of FIG. 8. Specifically, the power consumption reward information RPb has boundary values Pb1 and Pb2, and has scores SPb1, SPb2, and SPb3 which can be obtained in ranges defined by the boundary values. The power consumption reward information RPu has boundary values Pu1 and Pu2, and has scores SPu1, SPu2 and SPu3 which can be obtained in ranges defined by the boundary values.

<Reward Information Determination Processing>

Figure 10:
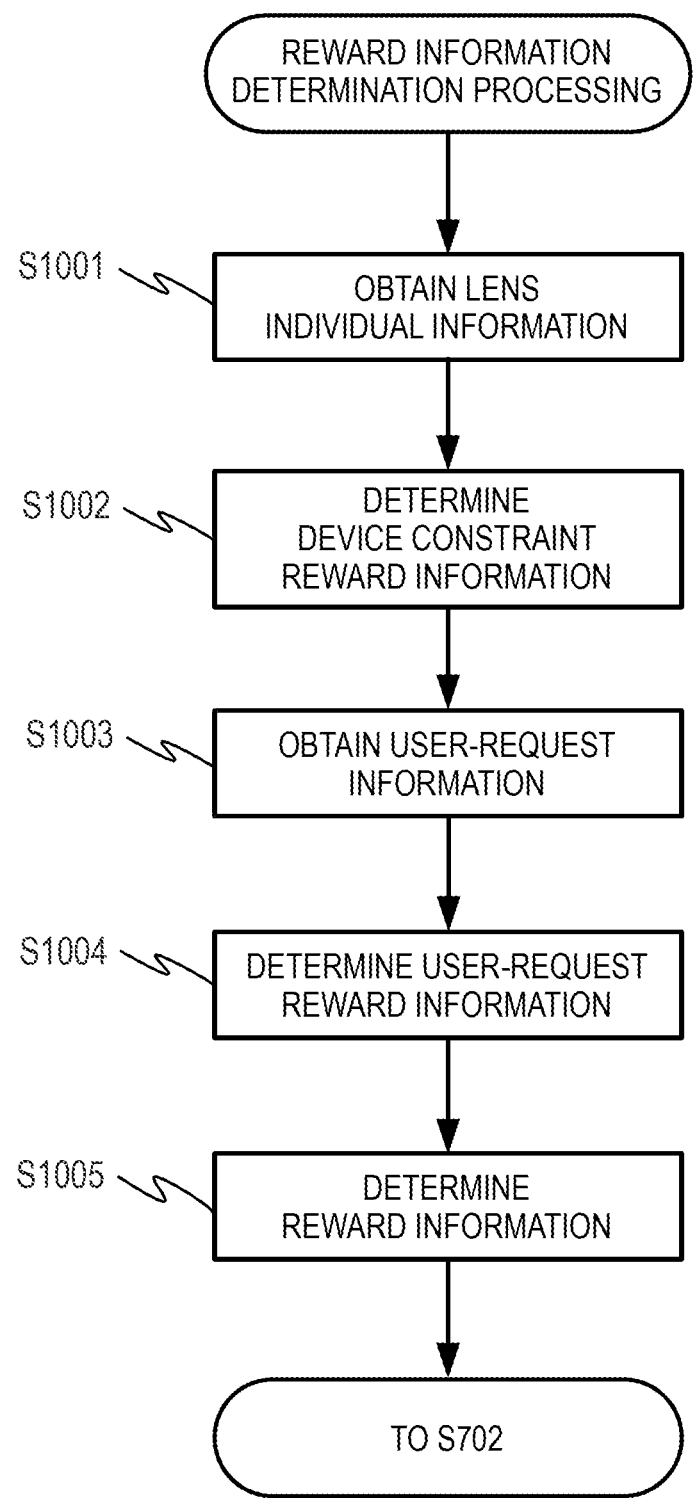
FIG. 10 is a flowchart showing the flow of reward information determination processing.

Next, referring to FIG. 10 to FIG. 14, the determination processing of the reward information in step S703 will be described. FIG. 10 is a flowchart showing a flow of the determination processing of reward information.

First, when the determination processing of the reward information is started in step S703, the process proceeds to step S1001. In step S1001, in a state where the lens 100 attached to the camera body 200, the learning unit 220 obtains the lens individual information from the lens individual information management unit 127 via the controller 125, the communication unit 126, the communication unit 212, and the controller 211.

In step S1002, the device constraint reward management unit 224 determines the device constraint reward information corresponding to the lens 100 from the device constraint reward information database stored by the device constraint reward information storing unit 228 in accordance with the lens model information of the lens individual information. Referring now to FIG. 11A to FIG. 11D, the device constraint reward information database and a method of determining the device constraint reward information using the device constraint reward information database will be described. FIG. 11A to FIG. 11D show an example of the data structure of the device constraint reward information database stored by the device constraint reward information storing unit 228.

FIG. 11A shows an example of the data structure of the database of the positioning precision reward information REb. The database of positioning precision reward information REb includes a plurality of the positioning precision reward information REb of which the boundary values and the scores are different for each lens model. FIG. 11B shows an example of the data structure of the database of the velocity reward information RVb. The database of the velocity reward information RVb includes a plurality of the velocity reward information RVb of which the boundary values and the scores are different for each lens model. FIG. 11C shows an example of the data structure of the database of the acceleration reward information RAb. The database of the acceleration reward information RAb includes a plurality of the acceleration reward information RAb of which the boundary values and the scores are different for each lens model. FIG. 11D shows an example of the data structure of the database of the power consumption reward information RPb. The database of the power consumption reward information RPb includes a plurality of the power consumption reward information RPb of which the boundary values and the scores are different for each lens model.

The device constraint reward management unit 224 determines the positioning precision reward information REb corresponding to the lens model of the lens 100 from the database of the positioning precision reward information REb according to the lens model information of the lens individual information. For example, the device constraint reward management unit 224, when the lens 100 is a model A, sets the boundary values Eb1 and Eb2 of the positioning precision reward information REb to Eb1TA and Eb2TA, and the scores SEb1, SEb2 and SEb3 to SEb1TA, SEb2TA and SEb3TA.

Similarly, the device constraint reward management unit 224 determines the velocity reward information RVb, the acceleration reward information RAb, and the power consumption reward information RPb from the database of the velocity reward information RVb, the database of the acceleration reward information RAb, and the database of the power consumption reward information RPb, respectively. Although the present embodiment has described an example of configuring the device constraint reward information database for each lens model, a device constraint reward information database may be configured for each lens individual. In this case, the device constraint reward management unit 224 may determine the device constraint reward information according to an individual identification number included in the lens individual information.

Next, in step S1003, the user uses the operation unit 206 to set any of the predetermined user-request information as the user-request information to be currently applied. The user-request management unit 226 obtains the user-request information selected by the user via the controller 211, and determines the obtained user-request information as the user-request information to be currently applied. Here, user-request information includes respective level information of the positioning precision, the quietness, and the power consumption. The level information is information indicating the level required to be achieved for each of the positioning precision, the quietness and the power consumption included in the request information. For example, level 1, level 2, and level 3 respectively corresponding to the high level, the medium level, and the low level are set as the level information for the positioning precision in advance, and the user can select any of the levels, which is required to be achieved for the positioning precision.

A method of setting the user-request information using the user-request information database will now be described referring to FIG. 12. Here, the user-request information includes the level information indicating the level required to be achieved with respect to the drive control of the focus lens by the user. The present embodiment information indicating the levels of requests for the positioning precision, the quietness and the power consumption which are user-request items as an example of user-request information.

FIG. 12 shows an example of the structure of the user-request information database stored by the user-request storing unit 227. The user-request information database includes the user-request ID, the positioning precision user-request information Eu, the quietness user-request information Su, the power consumption user-request information Pu, user identification information, the image pickup condition, and the date of creation information for one user-request information data.

Here, a unique numeric value that uniquely specifies the user-request information data is assigned to the user-request ID. The positioning precision user-request information Eu indicates the level required for the positioning precision of the user-request items. The quietness user-request information Su indicates the level required for the quietness of the user-request items. The power consumption user-request information Pu indicates the level required for the power consumption of the user-request items.

The user identification information is information for uniquely identifying the user who has set the user-request information data. The user identification information is information set by the user when the user-request information is generated.

The image pickup condition is information indicating an image pickup condition when the user-request information is set. The image pickup condition may include, for example, settings that affect the photographed image, such as the zoom position, the focus position, the diaphragm value, and the image stabilizing status, which are settings for the lens 100. In addition, the image pickup condition can include settings that affect the photographed image, such as information indicating moving image photographing or still image photographing, and settings of photographing mode, shutter speed, the autofocus control, and exposure control, which are settings for the camera body 200. In the date of creation information, information indicating the date and time when the user-request information data is created is recorded.

In the example shown in FIG. 12, the user-request information database includes three user-request information, i.e., user-request information u1, u2, and u3. However, the number of the user-request information is not limited to this, and may be optionally increased or decreased by the user.

With the configuration of the user-request information database described above, the value of the level of the user-request information and the information at the time when the user-request information is generated can be managed for one user-request information. In addition, with the above-described database configuration, it is possible to easily confirm the respective relationships of the user-request information used for the machine learning models to which the learning has been performed. Further, the search of the learned model to which the learning has been performed using the reward information generated according to similar user-request information can be facilitated.

Next, a method of setting the user-request information to be currently applied from among a plurality of the user-request information will be described. The user operates the operation unit 206 to select any of the user-request information u1, u2 and u3. The selected user-request information is transmitted to the user-request management unit 226 via the controller 211. The user-request management unit 226 manages the selected user-request information as the user-request information to be currently applied. Hereinafter, an example in which the user selects the user-request information u1 will be described.

Next, a method of changing the level of the user-request information item for the user-request to be currently applied will be described. The user operates the operation unit 206 to set the levels of the positioning precision user-request information Eu, the quietness user-request information Su, and the power consumption user-request information Pu of the selected user-request information u1.

The level of information set by the user is transmitted to the user-request management unit 226 via the controller 211. The user-request management unit 226 determines information of the level set by the user as the user-request information to be currently applied, and transmits the user-request information to be currently applied to the user-request reward management unit 225. In the example shown in FIG. 12, the level 1, the level 2, and the level 3 are set for the positioning precision user-request information Eu, the quietness user-request information Su, and the power consumption user-request information Pu, respectively.

Thus, the user can select the user-request information u1 as the user-request information, and set the level for each user-request item. Also, the user-request management unit 226 can request the update of the user-request information u1 of the user-request information database to the user-request storing unit 227 according to the level information set by the user. In this case, the user-request storing unit 227 can update the user-request information database according to the request of the update of the user-request information u1.

In the present embodiment, the case of changing the user-request information already existing in the user-request information database has been described, however user-request information initialized with a predetermined level may be newly created, and the level of each request item and the like may be changed. A new user-request information may be created by copying another user-request information, and the level of each request item may be changed.

Next, in step S1004, the user-request reward management unit 225 specifies the lens model of the lens 100 based on the lens individual information obtained in step S1001. The user-request reward management unit 225 also receives the user-request to be currently applied from the user-request management unit 226. The user-request reward management unit 225 determines the user-request reward information according to the lens individual information and the received user-request information.

More specifically, When the user-request reward management unit 225 receives each level information of the positioning precision, the quietness, and the power consumption included in the user-request information, the user-request reward management unit 225 transmits each level information to the user-request reward conversion information storing unit 229 together with the lens model information. The user-request reward conversion information storing unit 229 first determines the user-request reward conversion information to be used for the conversion of the user-request information from the user-request reward conversion information database according to the lens model information. Then, the user-request reward conversion information storing unit 229 refers to the determined user-request reward conversion information to convert each level information included in the user-request information to the user-request reward information.

Referring now to FIG. 13A to FIG. 13C, the user-request reward conversion information database and a method of determining the user-request reward conversion information using the user-request reward conversion information database will be described. FIG. 13A to FIG. 13C show an example of the data structure of the user-request reward conversion information database.

FIG. 13A shows an example of the data structure of the database of positioning precision user-request reward conversion information UREu. The positioning precision user-request reward conversion information UREu includes a plurality of the positioning precision reward information REu of which the boundary values and the scores are different for each level. The database of the positioning precision user-request reward conversion information UREu includes the positioning precision user-request reward conversion information UREu for each lens model. For example, for the model A, the positioning precision reward information REu used when the positioning precision user-request information is level 1 is positioning precision reward information REuTAL1.

FIG. 13B shows an example of the data structure of the database of quietness user-request reward conversion information URSu. The quietness user-request reward conversion information URSu includes the velocity user-request reward conversion information URVu and the acceleration user-request reward conversion information URAu. The velocity user-request reward conversion information URVu includes a plurality of the velocity reward information RVu of which the boundary values and the scores are different for each level. The acceleration user-request reward conversion information URAu includes a plurality of the acceleration reward information RAu of which the boundary values and the scores are different for each level. The database of the quietness user-request reward conversion information URSu includes the velocity user-request reward conversion information URVu and the acceleration user-request reward conversion information URAu for each lens model. For example, for the model A, the velocity reward information RVu and the acceleration reward information RAu, which are used when the quietness user-request information is level 1, are velocity reward information RVuTAL1 and acceleration reward information RAuTAL1, respectively.

FIG. 13C shows an example of the data structure of the database of the power consumption user-request reward conversion information URPu. The power consumption user-request reward conversion information URPu includes a plurality of power consumption reward information RPu of which the boundary values and the scores are different for each level. The database of the power consumption user-request reward conversion information URPu includes the power consumption user-request reward conversion information URPu for each lens model. For example, for the model A, the power consumption reward information RPu used when the power consumption user-request information is level 1 is the power consumption reward information RPuTAL1.

For the positioning precision user-request reward conversion information UREu, the quietness user-request reward conversion information URSu, and the power consumption user-request reward conversion information URPu, the boundary values and the scores thereof are determined so that the user-request becomes higher in the order of level 1, level 2, and level 3. Specifically, for level 1, the boundary value is closer to the targets for each category than the boundary values of the other levels and the score is higher than the scores of the other levels.

For example, in the examples shown in FIG. 13A to FIG. 13C, if the lens 100 is the model A, the user-request reward conversion information storing unit 229 determines the user-request reward conversion information corresponding to the model A from the user-request reward conversion information database. In the example shown in FIG. 12, if the user-request information selected by the user is the user-request information u1, the levels of the positioning precision user-request information Eu, the quietness user-request information Su, and the power consumption user-request information Pu are level 1, level 2, and level 3, respectively. In this case, in the examples shown in FIG. 13A to FIG. 13C, the user-request reward conversion information storing unit 229 refers to the user-request reward conversion information corresponding to model A to convert each level information included in the user-request information to the user-request reward information. Thus, the positioning precision reward information REu, the velocity reward information RVu, the acceleration reward information RAu, and the power consumption reward information RPu become the positioning precision reward information REuTAL1, the velocity reward information RVuTAL2, the acceleration reward information RAuTAL2, and the power consumption reward information RPuTAL3, respectively.

If the user did not select user-request information after the lens 100 had been attached to the camera body 200, the user-request information used when the learning was performed for a lens previously attached to the camera body 200 may be used. Since the user-request information is information which does not depend on the lens model, the user request information can be used as it is without any changes when the lens 100 is replaced. Further, since the user often has the same request before and after the replacement of the lenses, the user-request setting which is complicated for the user can be omitted by not changing the user-request information.

Although the present embodiment has described an example of configuring the user-request reward conversion information database for each lens model, a user-request reward conversion information database may be configured for each lens individual, and the user-request reward conversion information may be determined according to an individual identification number of the lens individual information. In this case, the user-request reward management unit 225 may determine the user-request reward information according to the individual identification number included in the lens individual information.

When the user-request reward information is determined in step S1004, the process proceeds to step S1005. In step S1005, the reward management unit 223 combines the device constraint reward information determined in step S1002 and the user-request reward information determined in step S1004 to determine the reward information as shown in FIG. 9. Note that before the device constraint reward information determination processing in step S1002, the obtainment processing of the user-request information in step S1003 and the determination processing of the user-request reward information in step S1004 may be performed.

In the learning of the NN described above, as described referring to FIG. 8, the respective reward information of the device constraint reward information and the user-request reward information determined in this manner is used to determine the score of the focus control result. Then, the determined respective scores are added, and the cumulative score is determined as the final score (cumulative evaluation value) of the control result. Then, the reinforcement learning is performed using the final score of the control result as the reward so that and the reward becomes the largest.

Referring now to FIG. 14, a description will be given of the reward information database for storing the reward information described above. FIG. 14 shows an example of a data structure of reward information database. The reward information database includes a reward information ID, date of creation information, model information, the user-request information u, the device constraint reward information Rb, the user-request reward information Ru, and the user-request reward conversion information URu, for one reward information data.

Here, a unique number for uniquely specifying the reward information data is assigned to the reward information ID. In the date of creation information, information indicating the date and time when the reward information is created is recorded. In the model information, the lens model information of the lens individual information concerning the lens apparatus to the which reward information data is applied is recorded. Although the present embodiment shows an example in which a lens model is recorded as the model information, information for identifying a lens individual to which to the reward information data is applied, such as an individual identification number may be recorded.

In the user-request information u, the user-request information used to generate the reward information data is recorded. In the device constraint reward information Rb, a value indicating the device constraint reward information included in the reward information is recorded. In the user-request reward information Ru, a value indicating the user-request reward information included in reward information is recorded. In the user-request reward conversion information URu, a value indicate the user-request reward conversion information used to generate user-request reward information Ru is recorded.

In the example shown in FIG. 14, for example, reward information in which the reward information ID is RID1 is created at the date of creation Date1, and includes the device constraint reward information RbA1 and the user-request reward information Ru1A1. With respect to the reward information, the user-request information u and the user-request reward conversion information URu used when the user-request reward information Ru1A1 is generated are the user-request information u1 and the user-request reward conversion information URu1, respectively.

Reward information in which the reward information IDs are RID3 and RID4 has the same model information and the same user-request information, but indicates reward information in cases where the device constraint reward information database and the user-request reward conversion information database have changed due to upgrades or the like. If the device constraint reward information database and the user-request reward conversion information database change, the device constraint reward information Rb, the user-request reward information Ru, and the user-request reward conversion information URu change even though the reward information has the same model information and the same user-request information.

According to the data structure of the reward information database described above, it is possible to manage the value of reward information and various information when reward information is generated, for one reward information. In the present embodiment, an example of the data structure in which the actual information was recorded for the model information, the user-request information u, the device constraint reward information Rb, the user-request reward information Ru, and the user-request reward conversion information URu is described. However, the information data of the model information, the user-request information u, the device constraint reward information Rb, the user-request reward information Ru, and the user-request reward conversion information URu may be stored in their respective databases. In this case, the reward information database may include ID information for uniquely identifying various information from the respective databases to manage these information.

For example, the databases of the model information and the user-request reward information may be stored by an information storing unit (not shown). The databases of the user-request information u, the device constraint reward information Rb, and the user-request reward conversion information URu may be stored by the user-request storing unit 227, the device constraint reward information storing unit 228, and the user-request reward conversion information storing unit 229, respectively.

With the database configuration described above, it is possible to easily confirm the respective relationships of the reward information used for the machine learning models to which the learning has been performed. Further, the search of the learned model to which the learning has been performed using the similar reward information can be facilitated.

<Machine Learning Processing>

Figure 15:
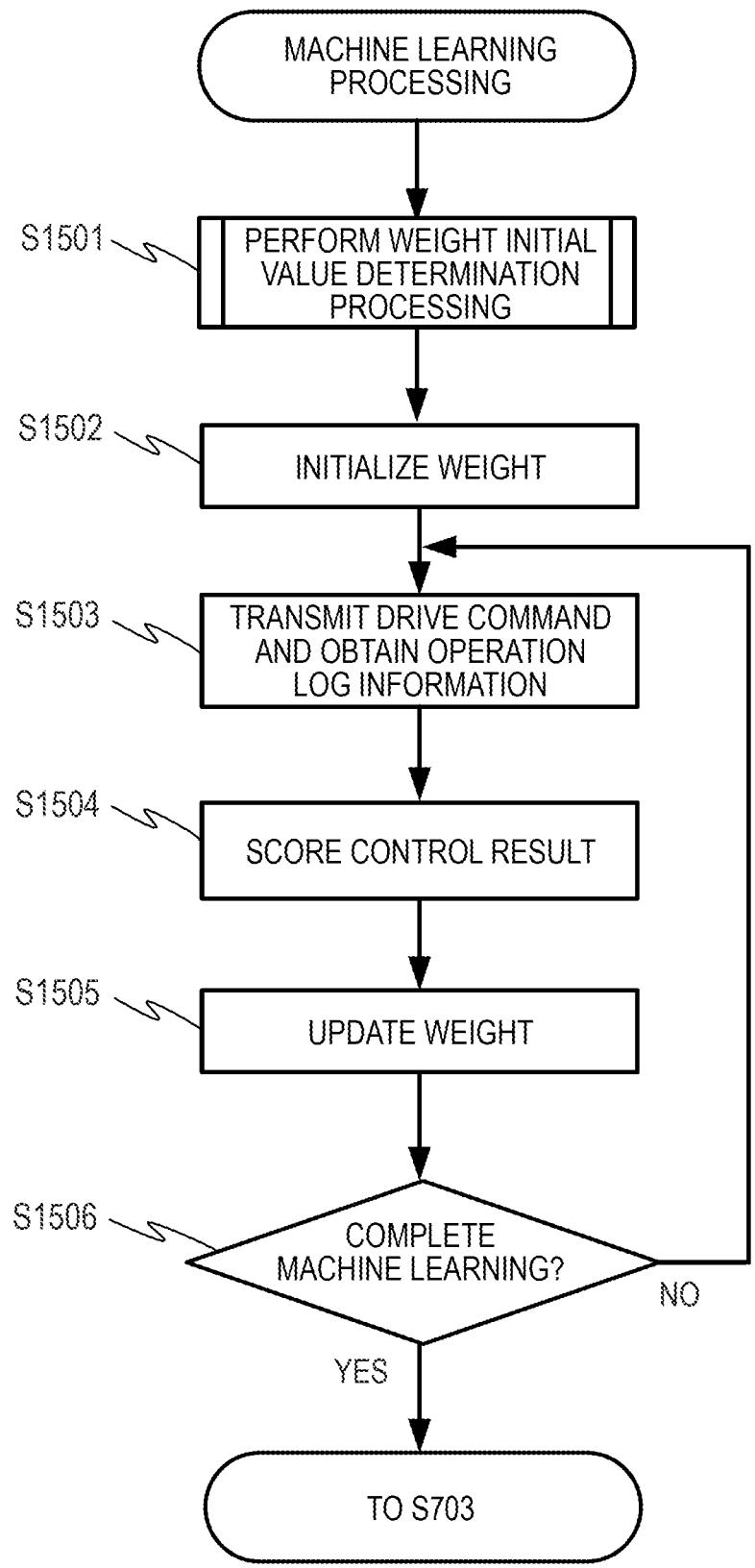
FIG. 15 is a flowchart showing the flow of machine learning processing.

Next, referring to FIG. 15 to FIG. 19, the machine learning processing according to the present embodiment will be described. FIG. 15 is a flowchart showing a flow of the machine learning processing according to the present embodiment. When the machine learning processing is started in step S704, the process proceeds to step S1501.

In step S1501, the machine learning initial value management unit 232 selects a learned model used as an initial model from among learned models to which the learning has been performed in the past or learned models stored in advance based on the lens individual information obtained in step S1001. The machine learning initial value management unit 232 specifies (determines) weight of the learned model selected as the initial model as an initial value of weight and sends the initial value of the weight to the learning processing unit 221. Details of weight initial value determination processing will be described later.

In step S1502, the learning processing unit 221 outputs the initial value of the weight to the controller 211. When the controller 211 receives the initial value of the weight from learning processing unit 221, the controller 211 sends the initial value of the weight to the lens 100 via the communication unit 212. When the lens 100 receives the initial value of the weight at the communication unit 126, the lens 100 causes the initial value of the weight to be stored in the NN data storage unit 123 the via the controller 125.

In step S1503, the learning processing unit 221 transmits a drive command of the focus lens 101 and an obtainment request of the operation log information to the lens 100 via the controller 211 and the communication unit 212. The learning processing unit 221 can store a specific drive pattern from a start position to a stop position predetermined for the learning as a drive command of the focus lens 101, and send the drive command according to the stored drive pattern. The driving pattern may be a random pattern. The learning processing unit 221 may also send a drive command of the focus lens 101 for executing the AF (autofocus) control.

In the lens 100, when the communication unit 126 receives the drive command of the focus lens 101, the controller 125 sends the drive command of the focus lens 101 to the NN controller 121. When the NN controller 121 receives the drive command, the NN controller 121 controls the drive of the focus lens 101 by using the weight stored in the NN data storage unit 123 as the weight of the NN.

Further, in the lens 100, when the communication unit 126 receives the obtainment request of the operation log information, the controller 125 transmit an output request of the operation log information to the operation log management unit 124. The operation log information will now be described. The operation log information is control result information which is an object used for determining the score when scoring the control result of the NN algorithm.

The operation log management unit 124 collects and records input/output information of the NN algorithm corresponding to the target position X1, the current position X2, the depth of focus X3, the focus sensitivity X4, and the drive signal Y1 shown in FIG. 6 for each control cycle of the NN algorithm. For example, the operation log management unit 124 records, as the operation log information, the drive command input to the NN controller 121 and the position information of the focus lens detected by the focus lens detector 106. Further, for example, the operation log management unit 124 determines the target position of the focus lens, the position information, and the positioning precision E from the drive command, and records them as the operation log information. In addition, for example, the operation log management unit 124 calculates the velocity and the acceleration of the focus lens from the position information of the focus lens, and records them as the operation log information. Furthermore, in a case where a power detector (not shown) is provided to measure the power consumption of the focus lens driving device 105, the operation log management unit 124 can also record information on the power consumption of the focus lens driving device 105 obtained from the power detector as the operation log information.

When the operation log management unit 124 receives the output request of the operation log information, the operation log management unit 124 transmits the operation log information recorded when the focus lens 101 is driven to the camera body 200 via the controller 125 and the communication unit 126. The operation log information transmitted to the camera body 200 is transmitted to the operation log storing unit 222 via the communication unit 212 and the controller 211, and is stored by the operation log storing unit 222.

Next, in step S1504, the learning processing unit 221 scores the control result of the NN algorithm based on the weight having the initial value on the basis of the reward information stored by the reward management unit 223 and the operation log information stored by the operation log storing unit 222. As for scoring of the control results, as described above, the control results of the NN algorithm are scored for each unit time based on the operation log information by using the reward information, and scores for each unit time are cumulated, so that the cumulated score of the control results of the NN algorithm can be determined.

Next, in step S1505, the learning processing unit 221 updates the weight so that the cumulative score of the control results of the NN algorithm is maximized. Although the Backpropagation may be used for the update of the weight, a method for updating the weight according to the present embodiment is not limited thereto, and any known method may be used. The generated weight is stored in the NN data storage unit 123 in the same procedure as in step S1502.

In step S1506, the learning processing unit 221 determines whether the learning for the weight is complete. The completion of the learning can be determined by, for example, whether the number of iterations of the learning (updating weight) has reached a specified value, or whether the amount of change in the cumulated score in the operation log information at the time of updating is smaller than a specified value. If the learning processing unit 221 determines that the learning is not complete, the process returns to step S1503 and the machine learning processing continues. On the other hand, if the learning processing unit 221 determines that the learning is completed, the machine learning processing ends. The machine learning model of which the learning is completed is added to and stored by the machine learning model database stored in the storage device of the learning processing unit 220.

By such processing, the machine learning processing of the NN is performed based on the device constraint reward information based on the configuration of the lens 100 and the user-request reward information corresponding to the user-request changed by the user setting. Thus, an NN capable of performing a suitable control according to the configuration of the lens 100 and the user-request is generated. The weight of the learned model (NN) updated in the machine learning processing is transmitted from the camera body 200 to the lens 100, is stored in the NN data storage unit 123 as described in step S1505, and can be used for the focus drive control.

A specific algorithm of the machine learning according to the present embodiment can includes a deep learning which generates a characteristic amount or a combining weighting factor using the NN by itself. In addition, a nearest neighbor algorithm, a Naive Bayes algorithm, a decision tree, a support vector machine, and the like can be included in the specific algorithm. The available algorithms may be applied to the present embodiment, suitably.

Note that, a GPU can perform efficient arithmetic operations by performing parallel processing of larger amounts of data. Therefore, in a case where learning is performed a plurality of times using a learning model such as deep learning, it is effective to perform processing with a GPU. Thus, a GPU is used in addition to a CPU for processing by the learning processing unit 221. Specifically, when a learning program including the learning model is executed, learning may be performed by the CPU and the GPU cooperating to perform arithmetic operations. Note that, with respect to the processing by the learning processing unit 221, arithmetic operations may be performed by only the CPU or the GPU.

Next, the machine learning model database will be described referring to FIG. 16. FIG. 16 shows an example of a data structure of the machine learning model database. The machine learning model database includes a machine learning model ID, a date of creation information, a reward information ID, a machine learning model NN, and a machine learning model initial value NNi, for one machine learning model data. The machine learning models stored in the machine learning model database are learned models to which the learning has been performed.

A unique number for uniquely specifying the machine learning model data is assigned to the machine learning model ID. In the date of creation information, information indicating the date and time when the machine learning model is generated is recorded. The reward information ID is a unique number for uniquely specifying the reward information shown in FIG. 14, which has been used to generate the machine learning model. The machine learning model NN is information indicating the weight of the machine learning model. The machine learning model initial value NNi is information indicating weight of the machine learning model that has been used as an initial value of the machine learning model at the generation of the machine learning model. Here, the lens individual information, the user-request information, the user-request reward conversion information, and the reward information used to generate the machine learning model can be obtained from the reward information database based on the reward information ID.

In the example shown in FIG. 16, for example, a machine learning model of which the machine learning model ID is NNID1 is generated at the date of creation Date1, and weight information of the machine learning model is the machine learning model NN1. Further, in this case, the reward information used in the learning is the reward information RID1, and weight information of the machine learning model at the start of learning was the machine learning model initial value NNi1.

According to the data structure of the machine learning model database described above, the information indicating the weight of the learned model and information when the learned model is generated can be managed for one learned model. The present embodiment describes an example using information indicating actual weight for the machine learning model initial value NNi, but the machine learning model ID indicating an initial model may be used. A value recorded in the reward information database, which is indicated by the actual reward information ID, may be used instead of the reward information ID. The machine learning model NN and the machine learning model initial value NNi may include not only information indicating the weight but also information of a neural network structure or logic information of a neural network structure.

According to the database configuration described above, it is possible to easily confirm the respective relationships of the machine learning models to which the learning have been performed. Further, it is possible to easily search for machine learning models to which similar learning is performed.

<Weight Initial Value Determination Processing>

Figure 17:
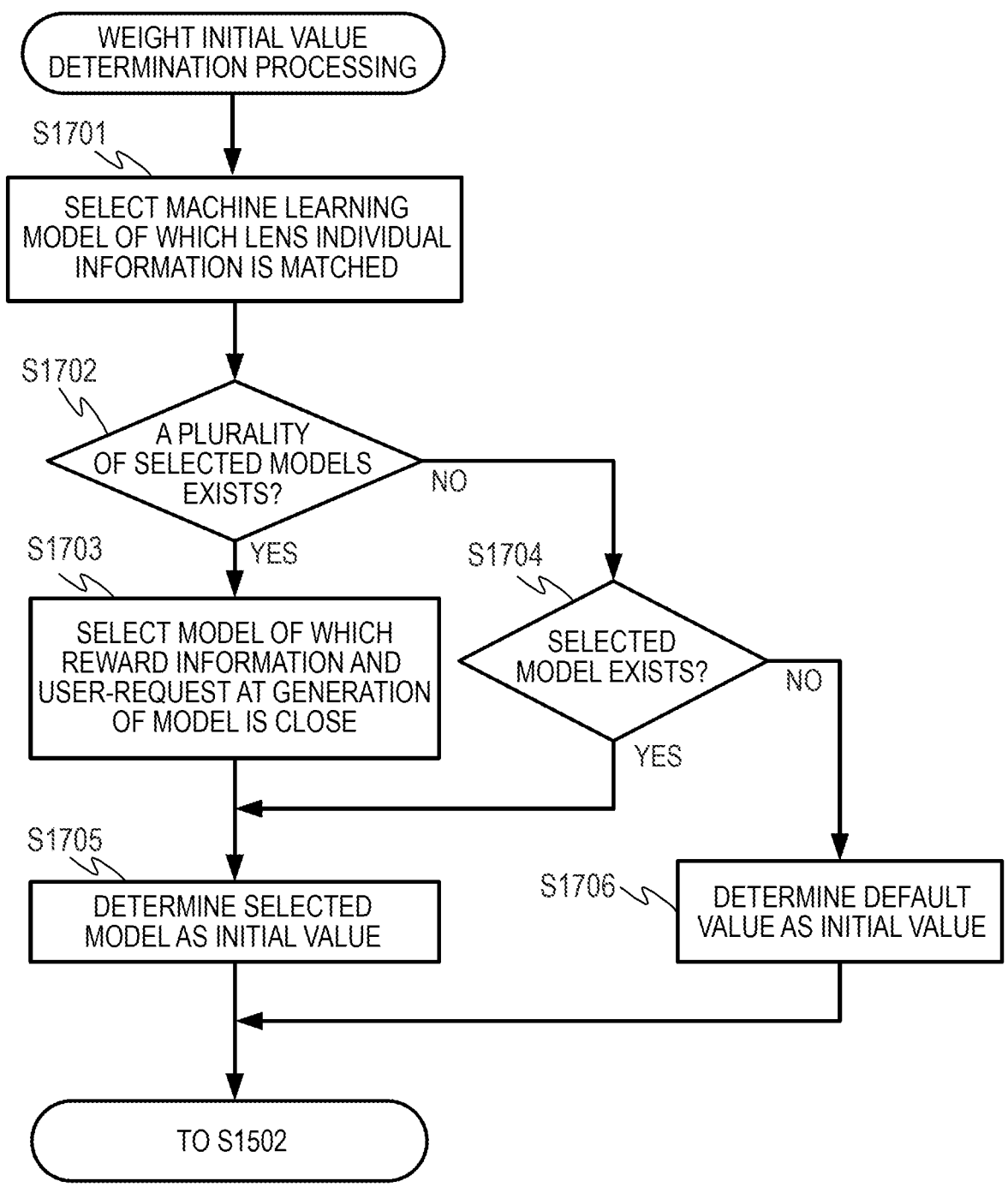
FIG. 17 is a flowchart showing the flow of weight initial value determination processing.

Next, referring to FIG. 17, the weight initial value determination processing of the NN in step S1501 will be described in detail. FIG. 17 is a flowchart showing the flow of the weight initial value determination processing. When weight initial value determination processing is started in step S1501, the process proceeds to step S1701.

In step S1701, the machine learning initial value management unit 232 requests, to the machine learning model storing unit 231, to select a learned model that lens individual information of a lens apparatus used to generate the learned model matches the lens individual information obtained in step S1001. The machine learning model storing unit 231 refers to the machine learning model database and the reward information database to select the machine learned model that the lens individual information of the lens apparatus used to generate the learned model matches the lens individual information of the lens 100.

Next, in step S1702, the machine learning model storing unit 231 determines whether or not there are a plurality of the selected learned models. If the machine learning model storing unit 231 determines that there are the plurality of the selected learned models, the process proceeds to step S1703. On the other hand, if the machine learning model storing unit 231 determines that there are not the plurality of the selected learned model, the process proceeds to step S1704.

In step S1703, the machine learning model storing unit 231 selects a learned model to which the learning has been performed using reward information or user-request information closest to the reward information or the user-request information to be currently applied. Details of the method of selecting the learned model will be described later. When the machine learning model storing unit 231 selects learned model to which the learning has been performed using reward information or user-request information closest to the reward information or the user-request information to be currently applied, the process proceeds to step S1705.

On the other hand, in step S1704, the machine learning model storing unit 231 determines whether or not there is a learned model selected in step S1701. If the machine learning model storing unit 231 determines that there is the learned model selected in step S1701, the process proceeds to step S1705. On the other hand, if the machine learning model storing unit 231 determines that there is no learned model selected in step S1701, the process proceeds to step S1706.

In step S1705, the machine learning initial value management unit 232 determines (specifies) weight of the learned model selected by the machine learning model storing unit 231 as the initial value of the weight of the NN. On the other hand, in step S1706, the machine learning initial value management unit 232 determines (specifies) the predetermined weight as the initial value of the weight of the NN. In step S1706, instead of the predetermined weight, the machine learning initial value management unit 232 may use weight of the NN currently used by the lens 100 as the initial value of the weight of the NN.

Thus, the machine learning initial value management unit 232 can determine the initial value of the weight of the NN from the lens individual information and the reward information or the user-request information. According to such processing, the NN used by the NN controller 121 can start the machine learning from weight of a learned model closest to the control target, and the number of times of driving the driving device during the machine learning can be reduced, and the machine learning time can be shortened.

Here, the present embodiment describes an example in which a learned model to which the learning has been performed using a lens apparatus of a model corresponding to the lens individual information is selected in step S1701. On the other hand, information on similar products may be included in the lens individual information in advance, and the learned model to which the learning has been performed using the similar products of the lens 100 may be selected. Although the determination processing in step S1704 is performed after the determination processing in step S1702 in the present embodiment, the determination processing in step S1704 may be performed before the determination processing in step S1702.

<Method of Selecting Learned Model of Closest Reward Information>

Next, referring to FIG. 18A to FIG. 18D, a method in which the machine learning model storing unit 231 selects, in step S1703, the learned model to which the learning has been performed using reward information closest to the learned model to be currently applied will be described. FIG. 18A to FIG. 18D show examples of values of user-request reward information in the reward information RID1 to RID3. Here, the user-request reward information includes the positioning precision reward information REu, the velocity reward information RVu, the acceleration reward information RAu, and the power consumption reward information RPu, and FIG. 18A to FIG. 18D show examples of data structures of the respective reward information. Hereinafter, an example in which the reward information RID1 is reward information actually used in the machine learning will be described.

In this case, the machine learning model storing unit 231 selects reward information closest to the reward information RID from among the reward information RID2 to RID3. For example, the machine learning model storing unit 231 calculates differences as absolute values between respective boundary values Eu1R1 and Eu2R1 of the reward information RID1 and respective boundary values Eu1 and Eu2 of the reward information to be compared.

Also, depending on the value of the score, the learning result changes. In this regard, for example, the machine learning model storing unit 231 calculates the ratios of scores SEu1R1, SEu2R1, and SEu3R1 of the reward information RID1, and calculates the ratios of scores SEu1, SEu2, and SEu3 of the reward information to be compared. Further, the machine learning model storing unit 231 calculates a difference as an absolute value between these calculated ratios.

Here, with respect to the differences related to the boundary values Eu1 and Eu2 and the difference related to the ratios of scores SEu1, SEu2 and SEu3, the smaller each difference related to the reward information is, the closer the reward information is to the reward information RID1. Therefore, the machine learning model storing unit 231 converts the differences related to the boundary values Eu1 and Eu2 and the difference related to the ratios of the scores SEu1, SEu2, and SEu3 into score indicating the similarity so that the smaller each difference is, the larger the similarity between the reward information is. In this case, reward information with the highest score indicating the similarity is the reward information that is closest to the reward information RID1.

The machine learning model storing unit 231 performs the above scoring to the velocity reward information RVu, the acceleration reward information RAu, and the power consumption reward information RPu. Then, the machine learning model storing unit 231 selects reward information having the highest summation value of the scores indicating the similarity for the positioning precision reward information REu, the velocity reward information RVu, the acceleration reward information RAu, and the power consumption reward information RPu.

As described above, the reward information closest to the reward information RID1 can be selected from among the reward information RID2 to RID3. The machine learning model storing unit 231 selects learned model to which the learning has been performed using the reward information selected in such a manner as the learned model to which the learning has been performed using the reward information closest to the reward information to be currently applied in step S1703.

With respect to scoring of the positioning precision reward information REu, the velocity reward information RVu, the acceleration reward information RAu, and the power consumption reward information RPu, the respective differences related to the boundary values and the score ratios may be multiplied by respective specific fixed coefficients according to the degree of influence of the machine learning result. Further, the score may be calculated from a predetermined polynomial function relating to the differences between boundary values and the difference between the score ratios.

In addition, in consideration of the mutual influence of the positioning precision reward information REu, the velocity reward information RVu, the acceleration reward information RAu, and the power consumption reward information RPu on the reward information, the calculated scores indicating the similarity for the respective information may be multiplied by respective specific fixed coefficients. Further, score may be calculated in consideration of the influence of the reward information from a polynomial function previously set for the calculated score indicating the similarity.

In the present embodiment, only the user-request reward information in the reward information was used to select the reward information closest to the reward information to be currently applied. On the other hand, a score indicating the similarity may be calculated from both of the user-request reward information and the device constraint reward information in the reward information, and the reward information closest to the reward information to be currently applied may be selected according to the calculated score.

In the present embodiment, the score indicating the similarity is calculated, but the closest reward information may be selected simply based on only the difference related to the boundary value or only the difference related to the ratio of the scores. In this case, the closest reward information may be selected for each of the positioning precision reward information REu, the velocity reward information RVu, the acceleration reward information RAu, and the power consumption reward information RPu, and reward information having the most items selected as the closest reward information may be selected as the general closest reward information. In this case, in consideration of the degree of influence of the reward information, a fixed coefficient or a polynomial function may be used to select the general closest reward information.

<Method for Selecting Learned Model of Closest User-Request>

Next, referring to FIG. 19, a method in which the machine learning model storing unit 231 selects, in step S1703, learned model to which the learning has been performed using user-request information closest to the user-request information to be currently applied will be described. FIG. 19 shows an example of values of the user-request in the user-request information u1 to u3. Here, the user-request information includes the positioning precision user-request information Eu, the quietness user-request information Su, and the power consumption user-request information Pu. Hereinafter, an example in which the user-request information u1 is user-request information used to generate reward information that is actually used in the machine learning will be described.

In this case, the machine learning model storing unit 231 selects user-request information closest to the user-request information u1 from among user-request information u2 to u3. For example, the machine learning model storing unit 231 calculates a difference as an absolute value between a level 1 indicated by the positioning precision user-request information Eu of the user-request information u1 and positioning precision user-request information Eu of user-request information to be compared.

Here, with respect to the difference related to the positioning precision user-request information Eu, the smaller the difference related to the user-request information is, the closer the user-request information is to the user-request information u1. Therefore, the machine learning model storing unit 231 converts the difference related to the positioning precision user-request information Eu into score indicating the similarity so that the smaller the difference is, the larger the similarity between the user-request information is. In this case, user-request information having the highest score indicating the similarity is user-request information closest to the user-request information u1.

The machine learning model storing unit 231 performs the above scoring to the quietness user-request information Su and the power consumption user-request information Pu. Then, the machine learning model storing unit 231 selects user-request information having the highest summation value of the scores indicating the similarity for the positioning precision user-request information Eu, the quietness user-request information Su, and the power consumption user-request information Pu.

As described above, the user-request information closest to the user-request information u1 can be selected from among the user-request information u2 to u3. The machine learning model storing unit 231 selects a learned model to which the learning has been performed using the user-request information selected in such a manner as a learned model to which the learning has been performed using the user-request information closest to the user-request information to be currently applied in step S1703.

With respect to scoring of the positioning precision user-request information Eu, the quietness user-request information Su, and the power consumption user-request information Pu, the calculated difference as an absolute value may be multiplied by a specific fixed coefficient. Further, the score may be calculated from a predetermined polynomial function relating to the difference as the calculated absolute value.

In addition, in consideration of mutual influence of the positioning precision user-request information Eu, the quietness user-request information Su, and the power consumption user-request information Pu on user-request information, the calculated scores indicating the similarity for the respective information may be multiplied by respective specific fixed coefficients. Further, score may be calculated in consideration of the influence of the user-request information from a polynomial function previously set for the calculated score indicating the similarity.

In the present embodiment, the score indicating the similarity is calculated, but the closest user-request information may be selected simply based on only the difference related to the user-request information. In this case, the closest user-request information may be selected for each of the positioning precision user-request information Eu, the quietness user-request information Su, and the power consumption user-request information Pu, and user-request information having the most items selected as the closest user-request information may be selected as the general closest user-request information. In this case, in consideration of the influence of user-request information, a fixed coefficient or a polynomial function may be used to select the general closest user-request information.

In addition, as a method for selecting a learned model to which the learning has been performed using reward information or user-request information closest to the reward information or the user-request information to be currently applied, it may be determined whether the learned model is selected based on the reward information or the user-request information in advance. Also, for example, if a plurality of learned models is selected as a learned model of the closest user-request information, a learned model of the closest reward information may be further selected from among the selected plurality of the learned models. On the other hand, if a plurality of learned models is selected as a learned model of the closest reward information, a learned model of the closest user-request information may be further selected from among the selected plurality of the learned models.

Further, if a plurality of learned models is selected for the learned model of the closest reward information or user-request information, the learned model which is most recently generated may be selected from the selected plurality of the learned models. In addition, the learning model may be managed in association with the photographed image, so that it is also possible to make the user designate a learned model based on the photographed image from among a plurality of learned models selected by the above-described processing and select the designated learned model.

As described above, the camera system according to the present embodiment functions as an example of an image pickup apparatus including the lens 100 and the camera body 200 having the image pickup element 201 configured to pickup an image formed by the lens 100. The lens 100 includes an optical member, a driving device configured to drive the optical member, and a controller configured to control the driving device based on a first learned model. Here, the first learned model is a learned model obtained by learning with respect to the lens 100 using a second learned model as an initial learned mode, and the second learned model is obtained by learning with respect to an apparatus different from the lens 100. In the present embodiment, the focus lens 101 functions as an example of the optical member of the lens 100, and the focus lens driving device 105 functions as an example of the driving device configured to drive the optical member of the lens 100. The NN controller 121 and the controller 125 of the lens 100 can configure a part of the controller configured to control the focus lens driving device 105 based on the first learned model.

The camera body 200 functions as an example of a camera apparatus to which the lens 100 is removably attached. In addition, the camera body 200 includes the learning unit 220 that functions as an example of a controller for obtaining the first learned model. The learning unit 220 can obtain the second learned model, and generate the first learned model based on reward information according to a request of a user using the second learned model as the initial learned model. Note that the controller 211 and the learning unit 220 can configure a part of the controller configured to obtain the first learned model.

Here, the learning unit 220 selects the second learned model from a group of learned models based on information on the lens 100 which is a lens apparatus. The learning unit 220 can select the second lens apparatus based on at least one of information on a lens apparatus used for learning of the learned models, information on initial values of the learned models, information on a request of a user used for the learning of the learned models, information on a reward used for the learning of the learned models, and information on a date of the learning. The learning unit 220 can also select the second learned model from the group of the learned models based on information on at least one of a reward or a request of a user used in the learning for obtaining the first learned model. The information on the lens apparatus may include lens individual information which is an example of information indicating model or an individual of the lens apparatus. Note that the machine learning model storing unit 231 of the learning unit 220 may function as an example of the selecting unit that selects the second learned model from the group of learned models.

In the present embodiment, the first learned model is obtained by applying weight updated by learning with respect to the lens 100 corresponding to the weight of the first learned model to the NN in the NN controller 121. Thus, the NN controller 121, the NN data storage unit 123 and the controller 125 which obtain the weight of the first learned model from the camera body 200 can configure a part of the controller of the lens 100 configured to obtain the first learned model.

According to such a configuration, the camera system according to the present embodiment determines a learned model to which the learning have been performed using an lens apparatus matching with or similar to the lens 100 used for performing learning from among the learned model generated in the past as an initial value of the NN. Thus, with respect to the NN of the lens 100, learning can be started from a learned model close to the learned model to which the learning is performed using the lens 100.

According to the above mentioned configuration, the camera system according to the present embodiment can obtain a final learned model with a smaller number of learning times than when starting learning from a predetermined machine learned model. As a result, the drive of the driving device during the machine learning can be reduced. Thus, according to the present embodiment, it is possible to provide an image pickup apparatus including a camera apparatus and a lens apparatus advantageous to the obtainment of the learned model. In addition, the camera system according the present embodiment can preform a driving control in accordance with a user-request by using reward information corresponding to user-request for the learning.

In the present embodiment, the lens individual information includes at least one of information indicating a lens model and information indicating a lens individual. The first learned model may be a learned model to which the learning has been performed using a lens apparatus having lens information coincident with the lens information indicating the lens 100. In addition, the reward information based on the configuration of the lens 100 may be specified using the lens individual information. Further, the reward information based on the request of the user is user-request reward information into which has been converted from user-request information based on conversion information specified using the lens individual information.

The camera system according to the present embodiment further includes the machine learning model storing unit 231 functioning as an example of a model management unit configured to manage a plurality of learned models. The machine learning model storing unit 231 can manage the plurality of the learned models, lens individual information used for the learning of the respective learned model, and learning related information in association with each other by a machine learning model database stored by the machine learning model storing unit 231. Here, the learning related information can include items included in the aforementioned machine learning model database. For example, the learning related information includes at least one of initial values of the respective learned models, user-request information, user-request reward conversion information used for conversion of the user-request information, reward information, and a time of learning. In this case, the machine learning model storing unit 231 may select the second learned model from the group of the learned model based on the lens individual information and the learning related information.

In this configuration, the learned model generated in the past can be associated with the information related to the machine learning and managed, so that the desired learned model can be easily searched. Therefore, a suitable learned model can be easily selected from the group of learned model generated in the past as the initial value of the machine learning to be performed.

Further, the machine learning model storing unit 231 according to the present embodiment can select the second learned model from the group of the learned models by using the lens individual information and at least one of the configuration of the lens 100 and the user-request reward information indicating the user-request information. Therefore, a suitable learned model can be easily selected from the group of learned model generated in the past as the initial value of the machine learning to be performed.

The camera system according to the present embodiment further includes the reward management unit 223 for managing a plurality of the reward information. The reward management unit 223 can manage the plurality of reward information, the lens information corresponding to each reward information, and reward generation information in association with each other using the reward information database stored by the reward information storing unit 230. Here, the reward generation information can include items included in the reward information database described above. For example, the reward generation information includes at least one of the request of the user, the conversion information used to convert the request of the user, and the date of creation of the reward information. In this case, the machine learning model storing unit 231 can select the second learned model based on the lens individual information and the reward generation information from the group of the learned models.

With such a configuration, desired reward information can be easily searched by managing reward information generated in the past in association with information related to the generation of the reward information. Therefore, the closest reward information to reward information used for the machine learning to be performed can easily be selected from the reward information generated in the past, and the machine learning model generated based on the closest reward information can easily be selected.

The camera system according to the present embodiment further includes the user-request management unit 226 functioning as an example of a request management unit configured to manage information on request of a plurality of users. The user-request management unit 226 can manage information of the request of the plurality of the users, the lens information when setting the information of the request of each user, and request related information in association with each other using a user-request information database stored by the user-request storing unit 227. The request related information can include items included in the user-request information database described above. For example, the request related information includes at least one of the user identification information, the image pickup condition information when the request is set, and the date and time when the request information is set. In this case, the machine learning model storing unit 231 may select the second learned model based on lens individual information and request related information from the group of learned model.

With such a configuration, a desired user-request information can be easily searched by managing the user-request information created in the past in association with information related to the generation of the user-request information. Therefore, the closest user-request information to user-request information which is the base of the reward information used for the machine learning to be performed can easily be selected from the user-request information generated in the past. Further, the machine learning model generated based on the closest user-request information can be easily selected.

Thus, by selecting the second learned model based on the reward generation information and the request related information, the machine learning model of which the reward information and the user-request information is closest to reward information or user-request information used for the learning to be performed can be determined as the initial value. Therefore, the learning can be started from the learned model which is closer to the learned model after the learning is performed using the lens 100, and the driving of the driving device during the machine learning can be further reduced.

In the present embodiment, the machine learning model storing unit 231 is configured to function as examples of a selecting unit configured to select the second learned model using the lens individual information, and a model management unit configured to manage a plurality of the learned models. On the other hand, the selecting unit and the model management unit may be provided as separate components. In this case, the machine learning model storing unit 231 may include the selecting unit and the model management unit.

In the present embodiment, regarding the four indices to be required for the focus lens control, the image pickup condition such as the f-number, the focus sensitivity, the driving time of the focus lens, the driving velocity, and the acceleration change are mentioned. However, the control image pickup condition is not limited thereto, and may be changed according to a desired configuration.

Further, although the current position, the depth of focus, and the focus sensitivity of the focus lens, which can be obtained in accordance with the configuration in the lens 100, are used for the learning as the inputs to the NN in the present embodiment, information obtained from a photographed image may be used for the learning. More specifically, the S/N ratio between the recorded voice and the drive sound of an actuator, and the defocus amount at the time of the photographing may be used for learning as the inputs to the NN.

Further, the input to the NN is not limited thereto, and for example, the attitude difference, the temperature, and the sound volume of the surrounding environment may be used. Regarding the attitude difference, the influence of the gravity when driving various lenses and the diaphragm changes, so that the driving torque required for the motor changes according to the attitude difference. Regarding the temperature, the characteristic of the lubricating oil used for the drive connection portion of the various lenses and the diaphragm changes, so the driving torque required for the motor changes according to the temperature.

In addition, for example, in the photographing in a place where the surrounding environment is quiet, a problem that the user feels the driving sound unpleasant may occur. Further, since the recording of the sound is performed at the same time when a moving image is photographed, a problem that the driving sounds unnecessary for the photographed image are recorded may occur. Accordingly, depending on the photographing situation, the quietness for reducing the driving sound as much as possible is request. On the other hand, for example, in the case where the driving velocity of the various lenses or diaphragm is restricted to suppress the driving sound of the motor, if the driving sound of the motor is in a range small with respect to the volume of the surrounding environment, the photographed image is not affected even if the restriction of the driving velocity is removed. Therefore, it is also useful to control the maximum velocity limit of the driving velocity in accordance with the volume of the surrounding environment.

In a case where other items are added to or the above mentioned items are reduced from the input items to the NN, the items used in calculating the reward can be changed according to the items input to the NN. As a result, it is possible to perform control according to a desired image pickup condition and the photographing situation based on the changed matter.

Further, if the lens 100 is replaced with a different lens apparatus, the camera body 200 can change the user-request reward information based on the lens individual information of the replaced lens apparatus. Specifically, the learning unit 220 of the camera body 200 uses reward information as information based on request of the user, which is obtained by converting the request of the user based on the user-request reward conversion information specified using the lens individual information indicating the replaced lens apparatus, for the learning. Thus, even if the lens apparatus is replaced, setting of the user-request for each lens replacement can be omitted. Therefore, at the time of lens replacement, the user-request used in the past can be used as it is, and the trouble of making the user set a new user-request can be saved.

Furthermore, by switching to device constraint reward information and user-request reward conversion information corresponding to the lens model and the lens individual when the lens is replaced, the reward information used for the machine learning can be optimized for the lens model and the lens individual.

In the present embodiment, the focus control for driving the focus lens is controlled using the learned model. However, the control using the learned model according to the present embodiment may be applied to other controls (the zoom control, the vibration isolation control, the diaphragm control, etc.).

Regarding the quietness and the power consumption, if an optical member such as the zoom lens is driven by an actuator, problems similar to the problem in the control of the drive of the focus lens occur. In addition, the positioning precision also has a problem in each control. For example, in the zoom control, the positioning precision to be required changes according to the relationship of the amount of change in magnification of the object in the change in the angle of view. Further, the positioning precision to be required changes according to the relationship between the driving amount of the zoom lens and the change amount of the view angle. In the vibration isolation control, the positioning precision to be required changes according to the information on the relationship between the focal length and the shift amount of the image. Further, in the diaphragm control, the positioning precision to be required changes according to the relationship between the drive amount of the diaphragm and the change amount of the luminance of the image.

Therefore, by applying the control using the learned model according to the present embodiment to the control (the zoom control, the vibration isolation control, the diaphragm control, etc.) other than the focus control, the matters related to the positioning precision, the quietness, and the power consumption to be required can be controlled in a well-balanced manner. It should be noted that the various modifications described above can be suitably applied to the following embodiments.

Second Embodiment

Figure 20:
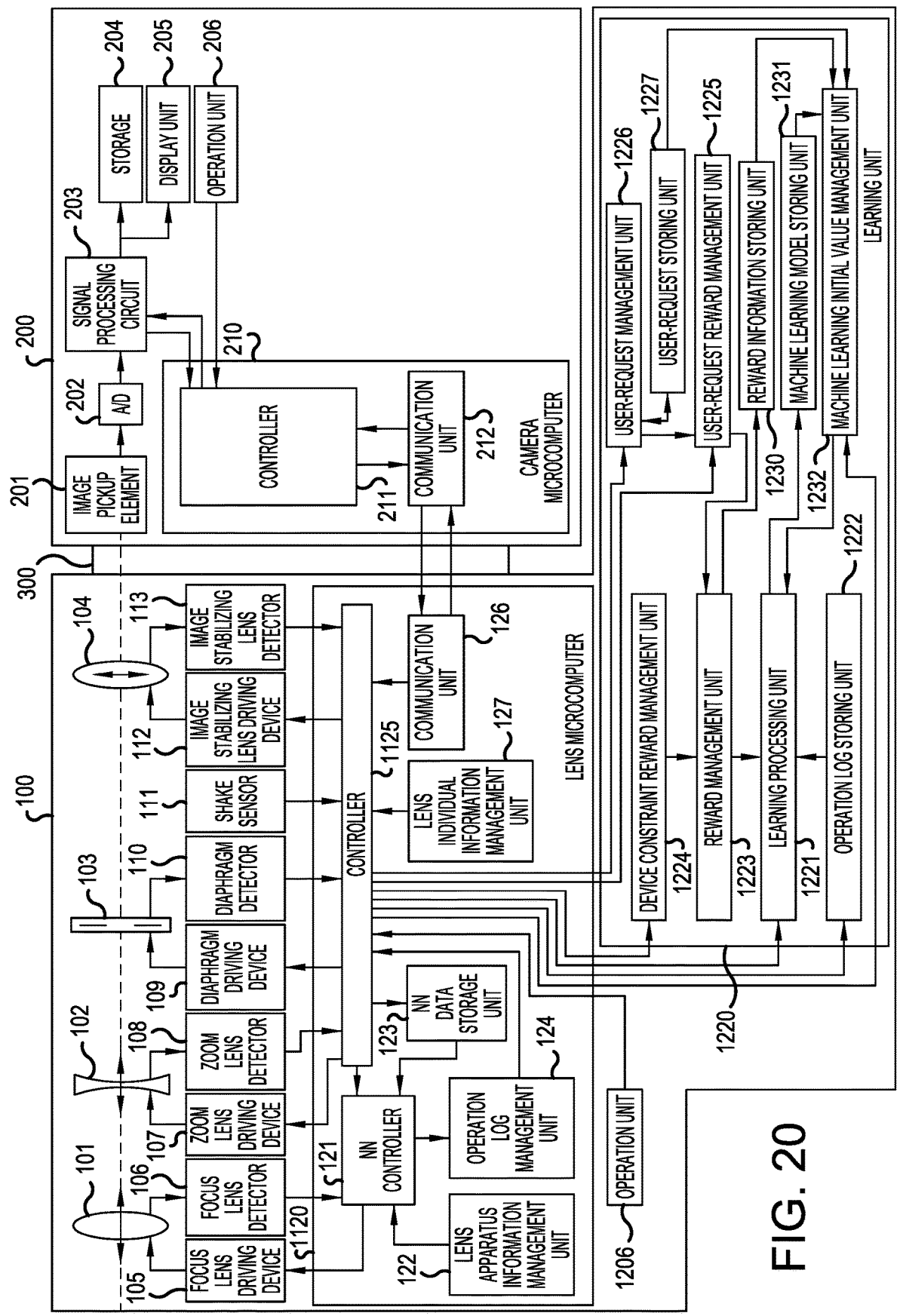
FIG. 20 is a block diagram illustrating a system configuration according to a second embodiment.

A camera system according to a second embodiment of the present disclosure will be described below referring to FIG. 20. FIG. 20 is a block diagram showing a system configuration of the camera system according to the present embodiment. The present embodiment differs from the first embodiment in that a lens apparatus includes a learning unit for performing the mechanical learning processing. The camera system according to the present embodiment has the same configuration as that of the camera system of the first embodiment except that the lens apparatus includes the learning unit and an operation unit. Therefore, a common symbol is assigned to the same configuration as that of first embodiment, and a description thereof is omitted. Hereinafter, the difference between the camera system according to the present embodiment and the camera system according to first embodiment will be described.

In the camera system according to the present embodiment, the camera body 200 does not include the learning unit 220. On the other hand, a lens 100 according to the present embodiment is provided with a lens microcomputer 1120, an operation unit 1206 and a learning unit 1220.

The lens microcomputer 1120 is provided with the controller 1125 different from the controller 125 related to the lens microcomputer 120 according to the first embodiment. The lens microcomputer 1120 differs from the lens microcomputer 120 according to the first embodiment in that the lens microcomputer 1120 is connected to the operation unit 1206 and the learning unit 1220 and communicates information with each of them.

The controller 1125 is a controller which controls the respective positions of the zoom lens 102, the diaphragm unit 103, and the image stabilizing lens 104, and controls information transmission with the learning unit 1220 and the camera body 200. The operation unit 1206 is an operation unit for the user to operate the lens 100, and the user can perform operations related to the machine learning such as setting of the user-request information by operating the operation unit 1206.

The learning unit 1220 may be configured using a processor (CPU, GPU, etc.) and a storage device (ROM, RAM, HDD, etc.). The learning unit 1220 includes a learning processing unit 1221, an operation log storing unit 1222, a reward management unit 1223, a device constraint reward management unit 1224, a user-request reward management unit 1225, a user-request management unit 1226, and a user-request storing unit 1227. The learning unit 1220 further includes a reward information storing unit 1230, a machine learning model storing unit 1231, and a machine learning initial value management unit 1232.

Each component of the learning unit 1220 may be realized by a processor such as a CPU or an MPU executing a software module stored in a storage device. The processor may be, for example, a GPU or an FPGA. Each component of the learning unit 1220 may be a circuit or the like which performs a specific function, such as an ASIC. Further, the storage device of the learning unit 1220 stores programs for implementing various components of the learning unit 1220, various information stored by each component of the learning unit 1220 such as operation log information stored by the operation log storing unit 1222, various databases, and the like.

The learning unit 1220 does not include the device constraint reward information storing unit 228 and the user-request reward conversion information storing unit 229. The operation of the learning unit 1220 is the same as the operation of the learning unit 220 of the first embodiment except that the device constraint reward information and the user-request reward conversion information are independent of the lens model.

In the present embodiment, the learning unit 1220 configured to perform the machine learning is provided in the lens 100. Accordingly, the same information transfer as the information transfer between the camera microcomputer 210 and the learning unit 220 in the first embodiment is performed between the controller 1125 and the learning unit 1220.

Further, in the present embodiment, since the learning unit 1220 performs the learning using the lens 100, the model of the lens apparatus and the individual of the lens used for the learning are uniquely specified. Thus, there is no device constraint reward information database and no user-request reward conversion information database for each lens model, and the device constraint reward information and the user-request reward conversion information for lens 100 are uniquely specified.

In the present embodiment, the NN controller 121, the controller 1125, and the learning unit 1220 may configure a part of a controller of the lens 100. Thus, the controller of the lens 100 can control the driving device based on a first learned model. The controller of the lens 100 can obtain the first learned model. Specifically, the controller of the lens 100 may obtain a second learned model, and generate the first learned model based on reward information according to request of the user by using the second learned model as an initial learned model. In addition, the controller of the lens 100 can select the second learned model from a group of the learned models based on information on the lens 100. The method of selecting the second learned model may be the same as the method described in the first embodiment.

Even in the configuration of the present embodiment in which the learning unit 1220 is configured in the lens 100, the same processing as the mechanical learning processing according to the first embodiment is performed, so that the final learned model can be obtained with a smaller number of learning times as compared with a case where the learning is started from the predetermined mechanical learning model. As a result, it is possible to reduce the number of times of driving the driving device during the machine learning. Thus, according to the present embodiment, a lens apparatus advantageous for obtaining a learned model can be provided. Further, the lens 100 can control the drive in accordance with the user-request by using the reward information corresponding to the user-request in the learning.

Third Embodiment

A camera system according to third embodiment of the present disclosure will be described below referring to FIG. 21. FIG. 21 is a block diagram showing a system configuration of a camera system according to the present embodiment. The present embodiment differs from the first embodiment in that a remote device includes a learning unit for performing the machine learning processing.

The camera system according to the present embodiment has the same configuration as that of the camera system according to the first embodiment except that the remote device includes a learning unit and an operation unit, and therefore a common symbol is assigned to the same configuration as that of the first embodiment, and a description thereof is omitted. Hereinafter, the difference between the camera system according to the present embodiment and the camera system according to the first embodiment will be described.

A camera system according to the present embodiment is provided with a remote device 400 in addition to the lens 100 and the camera body 200. The remote device 400 is, for example, a portable terminal or a personal computer terminal. The remote device 400 may also be any server, such as, a cloud server, a fog server, an edge server, or the like.

The camera body 200 according to the present embodiment does not include the learning unit 220. On the other hand, the camera body 200 is provided with a communication unit 240. The communication unit 240 is a communication unit for communicating with the remote device 400.

The remote device 400 includes a display unit 401, an operation unit 402, a remote device microcomputer (hereinafter referred to as a remote device microcomputer 410), and a learning unit 420. The display unit 401 is a display unit of the remote device 400, and can display various information to the user of the remote device 400. The operation unit 402 is an operation unit for a user to operate the remote device 400.

A remote device microcomputer 410 is provided with a controller 411 and a communication unit 412. The controller 411 is a controller that controls the remote device 400. The communication unit 412 is a communication unit for communicating with the camera body 200.

The learning unit 420 can be configured by using a processor (CPU, GPU, etc.) and a storage device (ROM, RAM, HDD, etc.). The learning unit 420 includes a learning processing unit 421, an operation log storing unit 422, a reward management unit 423, a device constraint reward management unit 424, a user-request reward management unit 425, a user-request management unit 426, a user-request storing unit 427, and a device constraint reward information storing unit 428. The learning unit 420 further includes a user-request reward conversion information storing unit 429, a reward information storing unit 430, a machine learning model storing unit 431, and a machine learning initial value management unit 432.

Each component of the learning unit 420 may be realized by a processor such as a CPU or an MPU executing a software module stored in a storage device. The processor may be, for example, a GPU or an FPGA. Each component of the learning unit 420 may be a circuit or the like which performs a specific function such as an ASIC. The storage device of the learning unit 420 stores programs for implementing various components of the learning unit 420, various information stored by each component of the learning unit 420 such as operation log information stored by the operation log storing unit 422, various databases, and the like.

Here, the operation of the learning unit 420 is similar to the operation of the learning unit 220 according to the first embodiment. The communication unit 240 and the communication unit 412 are connected by wireless communication. The wireless communication may be short-range wireless communication such as Bluetooth (trademark) or Wi-Fi, or public wireless communication such as public wireless LAN. Note that the communication between the communication unit 240 and the communication unit 412 may be a wired communication.

In the present embodiment, a learning unit 420 configured to perform the machine learning included in the remote device 400. Thus, the information transfer between the camera microcomputer 210 and the learning unit 220 in the first embodiment is performed between the camera microcomputer 210 and the learning unit 420. Further, image data output from the signal processing circuit 203 can be transmitted to the controller 411 via the controller 211, the communication unit 240, and the communication unit 412. The image data transmitted to the controller 411 can be displayed on the display unit 401.

The user-request information including the respective level information of the positioning precision, the quietness and the power consumption set by the user by the operation unit 206 or the operation unit 402 is transmitted to the user-request reward management unit 425 via the controller 411. The user-request reward management unit 425 updates the user-request information database based on the received user-request information.

Further, when the user performs an operation to indicate a machine learning performance from the operation unit 206 or the operation unit 402, a command for a machine learning performance is transmitted to the learning unit 420 via the controller 411. When the learning unit 420 receives the command for the machine learning performance, the learning unit 420 determines reward information and a weight initial value, and starts the machine learning processing as well as the processing in the learning unit 220 according to the first embodiment.

In this manner, in the present embodiment, a suitable initial value of the machine learning is determined based on the user-request reward information set by the user and the learning of the NN is performed by an operation similar to the operation in the first embodiment. The weight of the learned model updated in the machine learning processing by the learning unit 420 is transmitted from the remote device 400 to the lens 100 via the camera body 200, stored in the NN data storage unit 123, and can be used for the focus drive control. According to the above operation, the user can generate the NN that can perform a suitable control according to the user setting while confirming the photographed image at a remote place. In this case, the controller 211 of the camera body 200, which obtains the weight of the first learned model from the remote device 400, functions as an example of a controller of the camera apparatus configured to obtain the first learned model.

It should be noted that the operation unit 206 may be used to allow a user to perform an operation to indicate the performance of the machine learning and to set the user-request reward information from the camera body 200. In this case, only the high-speed arithmetic processing for the learning can be performed by the remote device 400. In the present embodiment, the large-capacity database can be configured in the remote device 400 separate from the lens 100 and the camera body 200, and the lens 100 and the camera body 200 can be miniaturized.

Even in the configuration according to the present embodiment in which the learning unit 420 is configured in the remote device 400, the same processing as the machine learning processing of the first embodiment is performed, so that the final learned model can be obtained with a smaller number of learning times as compared with a case where the learning is started from the predetermined machine learning model. As a result, it is possible to reduce the number of times of driving the driving device during the machine learning. Thus, according to the present embodiment, an imaging system can be provided that includes a lens apparatus advantageous to obtain a learned model, a camera apparatus, and a remote device. In addition, the camera system according to the present embodiment can control the driving according to the user-request by using the reward information corresponding to the user request for the learning.

All or a part of the user-request management unit 426, the user-request storing unit 427, the device constraint reward management unit 424, the device constraint reward information storing unit 428, the user-request reward management unit 425, the user-request reward conversion information storing unit 429, the reward management unit 423, and the reward information storing unit 430 may be configured in a remote device other than the lens 100, the camera body 200, and the remote device 400. Similarly, all or a part of the operation log storing unit 422, the machine learning model storing unit 431, and the machine learning initial value management unit 432 may be configured in a remote device separate from the lens 100, the camera body 200, and the remote device 400. In the present embodiment, the lens 100 communicates with the remote device 400 via the camera body 200, but may communicate directly with the remote device 400. In this case, the NN controller 121, the NN data storage unit 123, and the controller 125, which obtain weight of the first learned model from the remote device 400, can configure a part of the controller of the lens 100, which obtains the first learned model.

In the above-mentioned first to third embodiment, the configuration in which the focus lens is controlled by using the NN included in the NN controller 121 in the lens 100 has been described. However, it is not necessary to provide the NN in the lens apparatus. For example, the NN may be implemented in the camera body 200, the remote device 400, or another remote device. In this case, the NN controller 121 or the controller 125 of the lens 100 may transmit the input to the NN via the communication unit 126, receive the drive command of the focus lens output from the NN, and drive the focus lens driving device 105. Similar operations may also be applied to other controls (the zoom control, the vibration isolation control, the diaphragm control, etc.) as described above.

According to the first to third embodiment, for example, a lens apparatus advantageous for obtaining a learned model can be provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-199008, filed Nov. 30, 2020, which is hereby incorporated by reference herein in its entirety.

What is claimed is:

1. A lens apparatus comprising:
an optical member;
a driving device configured to drive the optical member; and
a controller configured to control the driving device based on a first learned model,
wherein the first learned model is a learned model obtained by learning with respect to the lens apparatus using a second learned model as an initial learned model, the second learned model being obtained by learning with respect to an apparatus different from the lens apparatus.

2. The lens apparatus according to claim 1, wherein the controller is configured to obtain the first learned model.

3. The lens apparatus according to claim 2, wherein the controller is configured to obtain the second learned model, and generate the first learned model using the second learned model as the initial learned model based on reward information according to a request of a user.

4. The lens apparatus according to claim 2, wherein the controller is configured to select the second learned model from a group of learned models based on information on the lens apparatus.

5. The lens apparatus according to claim 4, wherein the controller is configured to select the second learned model based on at least one of information on a lens apparatus used for learning of a learned model, information on an initial value of a learned model, information on a request of a user used for learning of a learned model, information on a reward used for learning of a learned model, and information on a time of learning.

6. The lens apparatus according to claim 4, wherein the controller is configured to select the second learned model from the group of the learned models based on information on at least one of a reward or a request of a user to be used in learning for generating the first learned model.

7. The lens apparatus according to claim 4, wherein the information on the lens apparatus includes information indicating a model and an individual of the lens apparatus.

8. An image pickup apparatus comprising:
the lens apparatus according to claim 1; and
an image pickup element configured to pickup an image formed by the lens apparatus.

9. A camera apparatus to which the lens apparatus of claim 1 is removably attached, the camera apparatus comprising:
a controller configured to obtain the first learned model.

10. The camera apparatus according to claim 9, wherein the controller of the camera apparatus is configured to obtain the second learned model, and generate the first learned model using the second learned model as the initial learned model based on reward information according to a request of a user.

11. The camera apparatus according to claim 10, wherein the controller of the camera apparatus is configured to select the second learned model from a group of learned models based on information on the lens apparatus.

12. The camera apparatus according to claim 11, wherein the controller of the camera apparatus is configured to select the second learned model based on at least one of information on a lens apparatus used for learning of a learned model, information on an initial value of a learned model, information on a request of a user used for learning of a learned model, information on a reward used for learning of a learned model, and information on a time of learning.

13. The camera apparatus according to claim 11, wherein the controller of the camera apparatus is configured to select the second learned model from the group of the learned models based on information on at least one of a reward or a request of a user to be used in learning for generating the first learned model.

14. The camera apparatus according to claim 11, wherein the information on the lens apparatus includes information indicating a model and an individual of the lens apparatus.

15. A controlling method comprising:
generating a first learned model; and
controlling driving of an optical member in a lens apparatus based on the first learned model,
wherein the first learned model is a learned model obtained by learning with respect to the lens apparatus using a second learned model as an initial learned model, the second learned model being obtained by learning with respect to an apparatus different from the lens apparatus.

16. A non-transitory computer-readable storage medium storing a program for causing a computer to execute a controlling method, wherein the controlling method comprises:
generating a first learned model, and
controlling driving of an optical member in a lens apparatus based on the first learned model,
wherein the first learned model is a learned model obtained by learning with respect to the lens apparatus using a second learned model as an initial learned model, the second learned model being obtained by learning with respect to an apparatus different from the lens apparatus.

* * * * *